US012639880B2

(12) United States Patent
Stepuch et al.

(10) Patent No.: US 12,639,880 B2
(45) Date of Patent: May 26, 2026

(54) GRAPHICS PROCESSING SYSTEMS

(71) Applicant: Arm Limited, Cambridge (GB)

(72) Inventors: Rafał Stepuch, Cambridge (GB); Frank Klaeboe Langtind, Melhus (NO); Andreas Due Engh-Halstvedt, Trondheim (NO)

(73) Assignee: ARM Limited, Cambridge (GB)

( * ) Notice: Subject to any disclaimer, the term of this patent is extended or adjusted under 35 U.S.C. 154(b) by 148 days.

(21) Appl. No.: 18/509,285

(22) Filed: Nov. 14, 2023

(65) Prior Publication Data

US 2024/0169643 A1    May 23, 2024

(30) Foreign Application Priority Data

Nov. 17, 2022    (GB) ...................................... 2217232

(51) Int. Cl.
G06T 15/00 (2011.01)
G06F 9/50 (2006.01)

(52) U.S. Cl.
CPC .............. G06T 15/005 (2013.01); G06F 9/50 (2013.01)

(58) Field of Classification Search
None
See application file for complete search history.

(56) References Cited

U.S. PATENT DOCUMENTS

| | | | |
|---|---|---|---|
| 2017/0330372 A1* | 11/2017 | Kakarlapudi | ........... G06T 11/40 |
| 2019/0138458 A1* | 5/2019 | Engh-Halstvedt | ........................... |
| | | | G06F 12/1045 |
| 2020/0379909 A1* | 12/2020 | Uhrenholt | ................. G06T 1/60 |
| 2021/0158598 A1* | 5/2021 | Bratt | ..................... G06T 15/005 |
| 2021/0256746 A1 | 8/2021 | Jesus et al. | |
| 2024/0169612 A1 | 5/2024 | Stepuch et al. | |

OTHER PUBLICATIONS

Non-final Office Action dated Jun. 17, 2025, U.S. Appl. No. 18/509,277, filed Nov. 14, 2023.
Response to Office Action dated Oct. 13, 2025, U.S. Appl. No. 18/509,277, filed Nov. 14, 2023.
Final Office Action dated Oct. 23, 2025, U.S. Appl. No. 18/509,277, filed Nov. 14, 2023.
Response to Final Office Action dated Dec. 23, 2025, U.S. Appl. No. 18/509,277, filed Nov. 14, 2023.
Advisory Action dated Jan. 12, 2026, U.S. Appl. No. 18/509,277, filed Nov. 14, 2023.
Non-final Office Action dated Apr. 8, 2026, U.S. Appl. No. 18/509,277, filed Nov. 14, 2023.

* cited by examiner

*Primary Examiner* — Andrew G Yang
(74) *Attorney, Agent, or Firm* — Pearl Cohen Zedek Latzer Baratz LLP

(57) ABSTRACT

When processing primitives in a tile-based graphics processing system in which a render output is sub-divided into a plurality of tiles for rendering, before a primitive is written to a primitive list corresponding to a region of the render output, it is first written to one or more primitive queues allocated to respective regions of the render output. To write the primitives to primitive lists, primitives are written together from a primitive queue allocated to a region of the render output to the primitive list for that region of the render output, in a single primitive list write cycle.

20 Claims, 7 Drawing Sheets

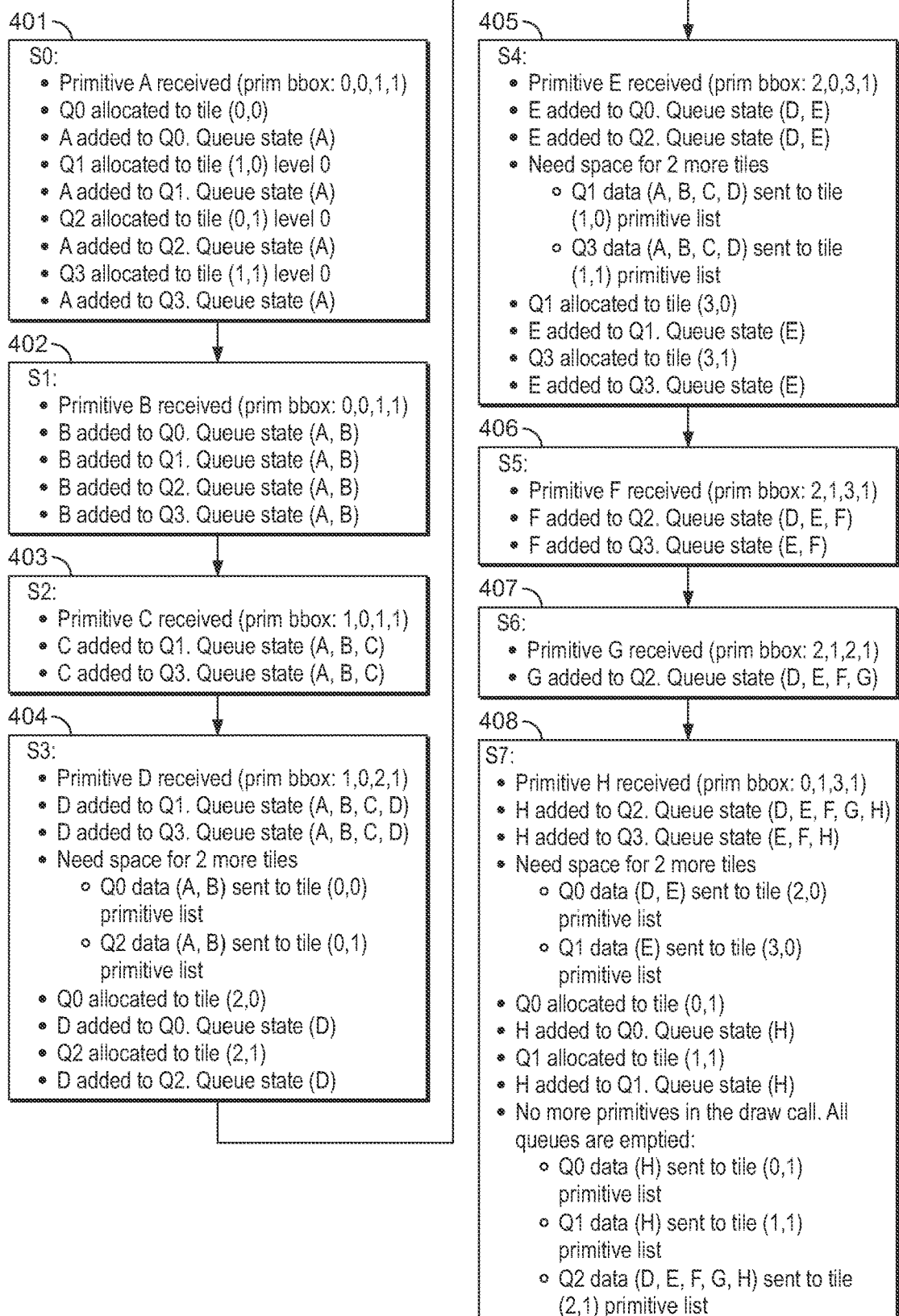

401
S0:
- Primitive A received (prim bbox: 0,0,1,1)
- Q0 allocated to tile (0,0)
- A added to Q0. Queue state (A)
- Q1 allocated to tile (1,0) level 0
- A added to Q1. Queue state (A)
- Q2 allocated to tile (0,1) level 0
- A added to Q2. Queue state (A)
- Q3 allocated to tile (1,1) level 0
- A added to Q3. Queue state (A)

402
S1:
- Primitive B received (prim bbox: 0,0,1,1)
- B added to Q0. Queue state (A, B)
- B added to Q1. Queue state (A, B)
- B added to Q2. Queue state (A, B)
- B added to Q3. Queue state (A, B)

403
S2:
- Primitive C received (prim bbox: 1,0,1,1)
- C added to Q1. Queue state (A, B, C)
- C added to Q3. Queue state (A, B, C)

404
S3:
- Primitive D received (prim bbox: 1,0,2,1)
- D added to Q1. Queue state (A, B, C, D)
- D added to Q3. Queue state (A, B, C, D)
- Need space for 2 more tiles
    - Q0 data (A, B) sent to tile (0,0) primitive list
    - Q2 data (A, B) sent to tile (0,1) primitive list
- Q0 allocated to tile (2,0)
- D added to Q0. Queue state (D)
- Q2 allocated to tile (2,1)
- D added to Q2. Queue state (D)

405
S4:
- Primitive E received (prim bbox: 2,0,3,1)
- E added to Q0. Queue state (D, E)
- E added to Q2. Queue state (D, E)
- Need space for 2 more tiles
    - Q1 data (A, B, C, D) sent to tile (1,0) primitive list
    - Q3 data (A, B, C, D) sent to tile (1,1) primitive list
- Q1 allocated to tile (3,0)
- E added to Q1. Queue state (E)
- Q3 allocated to tile (3,1)
- E added to Q3. Queue state (E)

406
S5:
- Primitive F received (prim bbox: 2,1,3,1)
- F added to Q2. Queue state (D, E, F)
- F added to Q3. Queue state (E, F)

407
S6:
- Primitive G received (prim bbox: 2,1,2,1)
- G added to Q2. Queue state (D, E, F, G)

408
S7:
- Primitive H received (prim bbox: 0,1,3,1)
- H added to Q2. Queue state (D, E, F, G, H)
- H added to Q3. Queue state (E, F, H)
- Need space for 2 more tiles
    - Q0 data (D, E) sent to tile (2,0) primitive list
    - Q1 data (E) sent to tile (3,0) primitive list
- Q0 allocated to tile (0,1)
- H added to Q0. Queue state (H)
- Q1 allocated to tile (1,1)
- H added to Q1. Queue state (H)
- No more primitives in the draw call. All queues are emptied:
    - Q0 data (H) sent to tile (0,1) primitive list
    - Q1 data (H) sent to tile (1,1) primitive list
    - Q2 data (D, E, F, G, H) sent to tile (2,1) primitive list
    - Q3 data (E, F, H) sent to tile (3,1) primitive list

FIG. 4

GRAPHICS PROCESSING SYSTEMS

BACKGROUND

The technology described herein relates to a method and apparatus for processing graphics, and in particular to a method and apparatus for use when processing graphics primitives in a tile-based graphics processing system.

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, or groups thereof.

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated.

Once primitives and their vertices have been generated and defined, they can be processed by the graphics processing system, in order to generate the desired graphics processing output (render target), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively. (The term "rasterisation" is sometimes used to mean both primitive conversion to sample positions and rendering. However, herein "rasterisation" will be used to refer to converting primitive data to sampling point addresses only.)

One form of graphics processing uses so called "tile based" rendering. In tile based rendering, the two dimensional render output (i.e. the output of the rendering process, such as an output frame to be displayed) is rendered as a plurality of smaller area regions, usually referred to as "rendering tiles". In such arrangements, the render output is typically divided (by area) into regularly sized and shaped rendering tiles (they are usually rectangles, e.g. squares). (Other terms that are commonly used for "tiling" and "tile based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile based graphics processing pipeline, the geometry (primitives) for the render output being generated is sorted into regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region). The sorting process produces lists of primitives to be rendered for different regions of the render output (referred to herein as "primitive" lists but also commonly referred to as "polygon" or "tile" lists).

Once the primitive lists have been prepared for all the render output regions, each rendering tile is processed, by rasterising and rendering the primitives listed for the region of the render output corresponding to the rendering tile.

The process of preparing primitive lists for regions of the render output thus basically involves determining which primitives should be processed for each render output region. This process is usually carried out by determining (at a desired level of accuracy) which regions of the render output each and every primitive that is to be processed intersects with (i.e. will (at least in part) fall within). Once it is determined which regions of the render output a particular primitive falls within, that primitive can then be written to the corresponding primitive list for each of those render output regions. Typically this determination is made using the positions of the vertices of each primitive. Thus, for each primitive to be processed, the graphics processor reads in the associated vertex data, converts the vertex positions at least to screen space (vertex shading), and then determines using the shaded vertex positions for each primitive which region(s) of the render output the primitive at least partially covers (and so should therefore be rendered for).

It should be noted here that where a primitive is determined to fall within more than one render output region, as will frequently be the case, it is included in a primitive list for each region that it falls within. A render output region for which it is to be determined whether a particular primitive falls within (and hence, for which a primitive list is prepared) could be a single rendering tile, or a group of plural rendering tiles, etc.

In effect, each render output region can be considered to have a "bin" (the primitive list) into which any primitive that is found to fall within (i.e. intersect with) the region is placed (and, indeed, the process of sorting the primitives on a region-by-region basis in this manner is commonly referred to as "binning").

The process of writing primitives to primitive lists (i.e. "bins") is typically carried out in a primitive-by-primitive manner, with each primitive being written to each of the primitive lists corresponding to each of the regions the primitive falls within in turn. In conventional systems, it takes one primitive list write cycle to write a single primitive to a primitive list. Thus, to write a primitive to each of the primitive lists for each of the regions it falls within, the (single) primitive will first be written to a first primitive list (corresponding to a first region that the primitive falls within) in a first primitive list write cycle, and then the (single) primitive is written to another primitive list (corresponding to another region that the primitive falls within) in a next primitive list write cycle, etc. and so on, until that (single) primitive has been written to each of the primitive lists corresponding to each of the regions the primitive falls within. So if, for example, a primitive is found to fall within four separate regions of the render output (such that it needs to be written to four primitive lists corresponding to those four regions), it will take four separate primitive list write cycles in order to write that primitive to each of the four corresponding primitive lists (in turn).

Once a primitive has been written to each of the primitive lists for each of the region it covers in this manner, then the same process is carried out for a next primitive, with that next primitive being written to each of the primitive lists corresponding to each of the regions it covers (at least in part) in turn, etc. and so on. This process is carried out for each primitive in the sequence of primitives to be processed, thereby building up each of the primitive lists.

The primitive lists prepared in this way can then be written out, e.g., to memory, and once a first processing pass including the tiling operation is complete, such that all of the primitive lists (for all of the primitives for all of render output regions) have been prepared, the primitive lists can then be used by the graphics processor, e.g. in a second (deferred) processing pass, to perform the actual rendering of the rendering tiles, with the information stored in the primitive lists being used accordingly to identify the primitives to be rendered for each rendering tile when generating the desired render output, e.g. frame for display.

The Applicants believe however that there remains scope for improvements in how primitives are written to primitive lists in tile based rendering systems.

BRIEF DESCRIPTION OF THE DRAWINGS

Various embodiments will now be described by way of example only and with reference to the following figures, in which:

FIG. 4 shows a process for writing primitives of the sequence of primitives shown in FIG. 2 to primitive queues, and writing those primitives from the primitive queues to primitive lists in an embodiment of the technology described herein;

DETAILED DESCRIPTION

Figure 1A:
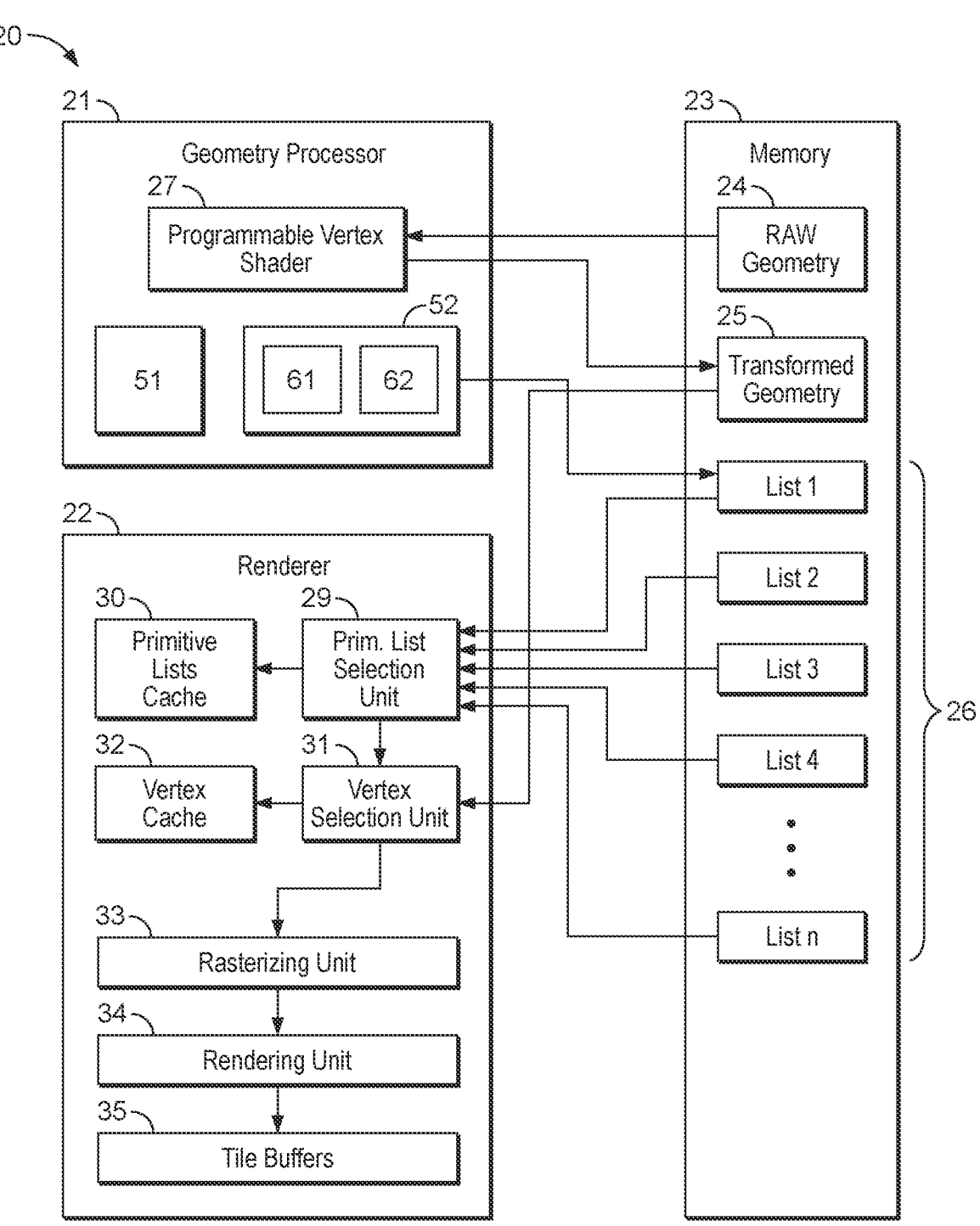
FIG. 1A shows schematically an arrangement of a graphics processing system that can be operated in accordance with the technology described herein.

A first embodiment of the technology described herein comprises a method of operating a tile-based graphics processing system in which a render output is sub-divided into a plurality of tiles for rendering, and in which primitives in a sequence of primitives to be processed are written to primitive lists corresponding to respective regions of the render output, the method comprising:

before writing a primitive to a primitive list, writing the primitive to one or more primitive queues allocated to respective regions of the render output; and thereafter:

writing the primitive from a primitive queue allocated to a region of the render output to a primitive list corresponding to that region of the render output, together with any other primitives in the primitive queue.

A second embodiment of the technology described herein comprises a tile-based graphics processing system in which a render output is sub-divided into a plurality of tiles for rendering, and comprising a tiling circuit configured to write primitives in a sequence of primitives to be processed to primitive lists corresponding to respective regions of the render output, wherein the tiling circuit comprises:

a primitive queueing circuit configured to:

before a primitive is written to a primitive list, write the primitive to one or more primitive queues allocated to respective regions of the render output; and a primitive list writing circuit configured to:

write a primitive from a primitive queue allocated to a region of the render output to a primitive list corresponding to that region of the render output, together with any other primitives in the primitive queue.

The technology described herein relates to tile-based graphics processing in which primitives are written to primitive lists corresponding to regions of the render output that they are determined to fall within.

Whereas in conventional systems a primitive to be processed would simply be written to each primitive list for each of the regions which it covers in turn (before doing the same for a next primitive to be processed, etc. and so on), in the technology described herein, primitives are first written to "primitive queues" allocated to respective regions of the render output.

Primitives that have been placed in a primitive queue allocated to a particular region of the render output are then written together from that primitive queue to the primitive list corresponding to that region. In other words, multiple (queued) primitives are written to the primitive list in a single primitive list write cycle.

Thus, in the technology described herein, rather than writing individual primitives to individual primitive lists in turn, primitives are placed in primitive queues together, for the purpose of being collectively written from the primitive queues to respective primitive lists. The Applicants have recognised that this approach is more efficient, since it enables multiple ("queued") primitives in a queue to be written to a primitive list in a single primitive list write cycle, and hence can lead to a reduction in the overall number of primitive list write cycles required to write primitives to their primitive lists, compared to conventional systems wherein each primitive is individually written to each required primitive list (in individual primitive list write cycles).

The Applicants have further recognised that this benefit in reducing the overall number of primitive list write cycles required to write the primitives to primitive lists can (and often does) outweigh the processing cost associated with, e.g., allocating primitive queues to respective regions of the render output, and placing primitives in those primitive queues, thereby leading to an overall reduction in the total processing power and/or number of processing cycles required to write the primitives into their primitive lists.

The technology described herein relates to tile-based graphics processing. The tiles can be any suitable size or shape. The tiles are in an embodiment all the same size and shape, as is known in the art, although this is not essential. In embodiments, each tile is rectangular (including square), and in an embodiment 16×16 or 32×32 sampling positions in size.

Similarly, the regions of the render output that the render output is sub-divided into (for the purposes of preparing primitive lists corresponding to those regions, and to which primitive queues can be allocated) may be any suitable size or shape. The regions can, and in embodiments do, directly correspond to the tiles of the render output (i.e. such that a primitive list is prepared for each tile that the render output is subdivided into). However, this need not necessarily be the case. For example, a region of the render output (for which a primitive list is prepared) could correspond to (i.e. cover) a number (e.g. four) of different (e.g. adjoining) tiles of the render output, or it could correspond to a fraction of a tile (i.e. such that a single tile covers a plurality of regions of the render output for which primitive lists are prepared). The regions for which primitive lists are prepared are in an embodiment all the same size and shape, although this need not necessarily be the case.

In some embodiments, there are one or more sets of regions for which primitive lists can be prepared, with the regions in different sets of regions in an embodiment differing in size (area).

In an embodiment, the sets of regions are arranged in a hierarchy of sets of regions, wherein each set of regions corresponds to a layer (level) in the hierarchy of sets of regions, and wherein regions in progressively higher layers (levels) of the hierarchy are progressively larger. Each set of regions (corresponding to a layer in the hierarchy) in an embodiment spans the (entire) render output, such that the render output is effectively overlaid by plural layers of sets of regions (and accordingly wherein regions in different layers in the hierarchy may overlap one another).

In an embodiment, each region for which a primitive list can be prepared in a lowest layer of the hierarchy corresponds to a single tile of the render output, with regions in successively higher layers encompassing progressively more tiles, e.g. corresponding to 2×2 tiles, 4×4 tiles, 8×8 tiles, etc. respectively (or any other suitable and desired increasing region size). Thus, the sets of regions in an embodiment comprise one set of regions in which each region of the set corresponds to a respective single rendering tile, and one or more (and in an embodiment more than one) sets of regions in which each region of the set corresponds to (encompasses) more than one rendering tile.

In an embodiment regions in the same set of regions (same layer of the hierarchy) are the same size and shape (for example, each encompassing the same number of tiles). In an embodiment regions in the same set of regions (same layer of the hierarchy) correspond to different regions of the render output (such that regions in the same set of regions do not overlap).

It will be apparent that, in such arrangements, regions in different sets of regions (different layers of the hierarchy) may encompass the same portion of a render output (albeit at a different resolution), such that a primitive may fall within one or more regions in different layers of the hierarchy (and correspondingly have one or more primitive lists into which it could be written). (Likewise, primitive lists for multiple different regions in different layers of the hierarchy may need to be consulted in order to identify primitives needed to render a tile).

In the technology described herein, before a primitive is written to a primitive list, the primitive is written to one or more primitive queues allocated to respective regions of the render output.

When a primitive is written to a particular primitive queue, it should be, and in embodiments is, added to the primitive queue alongside (after) any (earlier) other primitives that have also (already) been written to that primitive queue. In embodiments of the technology described herein, when a primitive is to be written to multiple primitive queues (allocated to multiple respective regions of the render output), the primitive is written to the multiple primitive queues in a single write cycle.

In an embodiment, the one or more primitive queues have a maximum allowed size (i.e. a maximum number of primitives that they can contain at a given time), which limits the storage footprint of the primitive queues. In an embodiment, all of the primitive queues have the same maximum allowed size, although this need not necessarily be the case.

In an embodiment, when a primitive is written to a primitive queue (allocated to a particular region of the render output), it is written to the primitive queue alongside any other data associated with the primitive that will later be written (along with the primitive) to the primitive list (corresponding to that region of the render output).

The one or more primitive queues may be stored in any suitable and desired storage. The storage may be part of the graphics processing system, or may be separate to the graphics processing system. It may be a dedicated storage for the purpose of storing the primitive queues, or it may be part of a storage that is used to store other data in addition to primitive queue data. The storage may be any suitable and desired information storage, such as, e.g., a register or registers, a buffer or buffers, a cache or caches, etc.

The primitive queues could be stored in (main) memory. However, in embodiments, the primitive queues are stored in registers that are local to the processing pipeline.

In an embodiment, each of the one or more primitive queues has stored data associated with it which indicates the region of the render output that the primitive queue is (currently) allocated to. (As will be discussed below, in embodiments of the technology described herein, this data can be updated as and when primitive queues are allocated (or re-allocated) to different regions of the render output.)

It would be possible for there to be only a single primitive queue (that is allocated to a single region of the render output) at a given time. However, in embodiments of the technology described herein, there are multiple primitive queues (allocated to multiple respective regions of the render output) maintained at a given time).

For example, it would be possible to have a number of primitive queues equal to the number of regions of the render output for which primitive lists are prepared, such that, e.g., there is a one-to-one mapping between primitive queues and regions of the render output, with each primitive queue being mapped to a respective different region of the render output. However, in embodiments of the technology described herein, there are fewer primitive queues than there are regions of the render output for which primitive lists are prepared, such that only a subset of the total number of regions of the render output will have allocated primitive queues at a given time. In an embodiment of the technology described herein, there are four primitive queues (allocated to four respective regions of the render output, at a given time).

As will be understood, a particular primitive may fall within (i.e. at least partially cover) multiple regions of the render output. In an embodiment, the primitive is written to one or more primitive queues allocated respectively to one or more of (and in an embodiment all of) the regions of the render output that the primitive is determined to fall within.

The process of determining what regions of the render output a primitive falls within, or potentially falls within, can be carried out in any suitable and desired manner, and at any suitable and desired level of precision, according to any number of methods known in the art.

For example, the set of regions covered by a particular primitive can be (and in some embodiments, is) determined at a high precision (or "exact") level by, e.g., directly using the primitive's vertex positions to calculate exactly which regions of the render output the primitive will appear (at least in part) in.

Alternatively, the set of regions covered by a particular primitive can be (and in some embodiments, is) determined at a comparatively lower level of precision, for example by using a so-called "bounding box" technique. In this case, a so called "bounding box" is drawn around a primitive, and then the regions of the render output covered by the bounding box are determined. The primitive is considered to fall within the set of regions covered by the bounding box (even though, as will be understood, the primitive may not actually fall within all of those regions, e.g. if the bounding box does not sufficiently tightly or precisely surround the primitive). The bounding box can be calculated at any suitable or desired level of resolution. For example, the bounding box could be (and in some embodiments, is) rounded to the size of the regions (e.g. tiles) that the render output is divided into (for which primitive lists are to be prepared).

In an embodiment, all of the regions of the render output (for which primitive lists are to be prepared) are able to have primitive queues allocated to them. However, this need not necessarily be the case. For example, it would be possible for only a (e.g. predefined) subset of regions of the render output to be able to have primitive queues allocated to them.

In an embodiment, the process of writing primitives to primitive queues is carried out for multiple (and in some embodiments, all) primitives in a sequence of primitives that are being processed. The sequence of primitives of primitives could (and in some embodiments does) correspond to the set of primitives for generating the entire (complete) render output (e.g. frame to be displayed), or could (and in some embodiment does) correspond to a set of primitives for generating part of the render output (e.g. corresponding to a draw call).

In an embodiment, the process of writing primitives to primitive queues is carried out for primitives of multiple different sequences of primitives (e.g. corresponding to multiple different draw calls). In an embodiment, primitive queues allocated to respective regions of the render output when being used by primitives in a first sequence of primitives have their allocations "reset" before being used by primitives in a next sequence of primitives. In other words, primitive queues that are allocated to particular regions of the render output in (e.g. at the end of) processing of a first sequence of primitives using the primitive queues in an embodiment have these allocations reset at the end of processing of the first sequence of primitives using the primitive queues, and before the next set of primitives is processed using the primitive queues begins (such that the allocations of the primitive queues used when processing the earlier sequence of primitives will no longer be present for the processing of the next sequence of primitives).

The primitive queues could be "pre-allocated" to respective regions of the render output, e.g. before any primitives (in the sequence of primitives to be processed) are written to the primitive queues. However, in embodiments, at the beginning of the processing of primitives in the sequence of primitives using the primitive queues (when primitives (in the sequence of primitives being processed) have not yet been written to the primitive queues and the primitive queues are therefore "empty"), one or more (and in an embodiment each) of the primitive queues is not (initially) allocated to any particular region of the render output, but can (and in an embodiment is) allocated to a region of the render output when necessary (in the manner described further below).

A primitive queue could be (and in some embodiments are) allocated to one (i.e. a single) region of the render output (only) for the duration of the processing of a (e.g. entire) sequence of primitives using the primitive queues. For example, primitive queues could be respectively (e.g. pre-) allocated to some (e.g. all) of the regions of the render output for which primitive lists are to be prepared, with those queues remaining allocated to their respective regions of the render output throughout the entire process of writing the primitives of the sequence of primitives to primitive queues.

However, in embodiments, rather than necessarily being (e.g. pre-) allocated to a particular single region of the render output only for the duration of the processing of a (e.g. entire) sequence of primitives, (one or more, and in an embodiment all of) the primitive queues can be allocated and re-allocated to different regions of the render output during the primitive queueing process, as necessary. Thus, in these embodiments, each primitive queue can be allocated to a particular region of the render output at one point during the processing of the sequence of primitives, but is able to then be (potentially) re-allocated to one or more other (different) regions of the render output at subsequent points during the processing of the sequence of primitives.

The Applicants have recognised that allowing primitive queues to be flexibly allocated to different regions of the render output as and when is necessary advantageously enables fewer primitive queues to flexibly serve (i.e. be allocated to) more regions of the render output over the course of the primitive queueing process. Therefore, this system of flexibly allocating primitive queues can advantageously reduce the number of primitive queues are required to be maintained simultaneously (and hence the overall storage required to store those primitive queues), whilst still providing the benefits of the primitive queueing system discussed above (i.e. the reduction in the total number of primitive list write cycles required to write primitives to primitive lists).

In these embodiments, each of the primitive queues can be flexibly allocated to any of the regions of the render output. However, this need not necessarily be the case, and it would, for example, be possible to have, e.g., a primitive queue that can only be allocated to regions of a first set of regions of the render output, and another primitive queue that can only be allocated to regions of a second (e.g. different) set of regions of the render output, etc. and so on.

In some embodiments wherein queues can be flexibly allocated to different regions of the render output, it is the case that there are fewer primitive queues than there are total regions of the render output (for which primitive lists are to be prepared). Hence (and as will be understood), in these embodiments, it will be the case that only a subset of the total number of regions of the render output will have primitive queues allocated to them at a given time. In some embodiments, when a primitive covering particular regions of the render output is to be written to primitive queues (corresponding to those particular regions of the render output) it should be (and in an embodiment is) determined, for each of those particular regions, whether or not there is currently a primitive queue already allocated to the region. When it is determined that there is indeed already a primitive queue allocated to the region, then the primitive should be (and in an embodiment is) written to the primitive queue that is already allocated to the particular region.

Thus according to an embodiment of the technology described herein, the method comprises (and the system is correspondingly configured to) determining whether there is already a primitive queue allocated to a region of the render output that a primitive falls within, and when it is determined that there is already a primitive queue allocated to the region of the render output that the primitive falls within, writing the primitive to that already-allocated primitive queue.

Thus, when a primitive that is being processed is to be written to primitive queue(s) (corresponding to the region(s) of the render output that the primitive falls within) and it is determined that there are indeed already primitive queue(s) allocated to (at least some of) those region(s) of the render output that the primitive falls within, then the primitive is in an embodiment simply written to each of those (already-allocated) primitive queues.

However, it may be the case that there are not any primitive queues already allocated to one or more of the regions of the render output that a primitive falls within. In embodiments, once it has been determined that there is not a primitive queue already allocated to a region of the render output that a primitive covers, an existing primitive queue (e.g. that is already allocated to a different region of the render output) is allocated (e.g. re-allocated, as discussed below) to the region of the render output that the primitive falls within, such that the primitive can then be (and in an embodiment is) written to this newly-allocated primitive queue.

Thus, in to an embodiment of the technology described herein, the method further comprises (and the system is correspondingly configured to) when it is determined that that there is not already a primitive queue allocated to the region of the render output that a primitive falls within, allocating a primitive queue to the region of the render output that the primitive covers, and writing the primitive to that now-allocated primitive queue.

In some embodiments, a primitive being processed could fall within (i.e. at least partially cover) a first set of one or more regions to which primitive queues have already been allocated, and also fall within (i.e. at least partially cover) another set of one or more regions to which primitive queues have not already been allocated. In this case, the primitive should be (and in an embodiment is) written to those primitive queues that are already allocated to the regions of the first set, and other (different) primitive queues should be (and in an embodiment are) allocated to the other regions of the second set (such that the primitive can then be written to the newly-allocated primitive queues).

Primitive queues may be allocated to respective regions of the render output in any suitable and desired manner. In an embodiment when a primitive queue is allocated (e.g. re-allocated) to a region of the render output, data indicating the region to which the primitive queue is now allocated (as discussed above) is stored in association with the primitive queue. In embodiments, when a primitive queue is being re-allocated from one region of the render output to another region of the render output (discussed further below), the stored data indicating the region to which the primitive was (previously) allocated is in an embodiment replaced with the data indicating the (new) region to which the primitive queue is now allocated.

In embodiments, as discussed above, primitive queues may be (and in an embodiment are) initially (at least) not allocated to any particular region of the render output. If it is the case that there is such an un-allocated primitive queue when it is determined that there are no primitive queues allocated to a particular to region of the render output that a primitive being processed falls within (i.e. at least partially covers), then in an embodiment an un-allocated primitive queue is simply allocated to that region of the render output (with then primitive in question then being written to this newly-allocated primitive queue).

However, as will be understood, in embodiments it could (and, indeed, in some embodiments, may often) be the case that that there are no such unallocated primitive queues, and that all of the primitive queues are already allocated to different regions of the render output. In this case, in order to allocate a primitive queue to a new region of the render output (that a primitive being processed falls within), one of the already-allocated primitive queues is in an embodiment re-allocated to that region of the render output.

As will be understood, a primitive queue which is already allocated to one region of the render output, and which is to be re-allocated to a different region (at least partially) covered by a primitive being processed, may (and in some embodiments will) already contain primitives (that were written to the already-allocated primitive queue). In this case, before re-allocating the primitive queue to the region covered by the primitive in question, the primitive queue is in an embodiment "written out" (or "flushed"), i.e. any (and all) primitives (currently) in the primitive queue are written to the primitive list corresponding to the region of the render output that the primitive queue was already allocated to.

Thus, in an embodiment of the technology described herein, the method comprises (and the system is correspondingly configured to), when allocating a primitive queue to a region of the render output that the primitive covers, first writing any primitives in a primitive queue allocated to a different region of the render output together to a primitive list corresponding to that different region of the render output; and then re-allocating that primitive queue that was allocated to a different region of the render output to the region of the render output that the primitive covers.

As will be understood, when it is determined that an already-allocated primitive queue should be re-allocated, it may be the case that there are a plurality of already-allocated primitive queues that could be re-allocated (such that one of the plurality of already-allocated primitive queues will need to be chosen for re-allocation). The already-allocated primitive queue that is chosen to be re-allocated can be chosen in any suitable and desired manner, for example according to any suitable and desired "replacement algorithm".

For example, the method could comprise (and the system could be correspondingly configured to) always choosing a primitive queue to re-allocate according to some (e.g. fixed) order or hierarchy (such that, e.g., primitive queues will be chosen for re-allocation in a certain order of preference). Alternatively, the method could comprise (and the system could be correspondingly configured to) preferentially choosing a primitive queue to re-allocate based on the number of primitives stored in the (existing) primitive queues (such that, e.g. the primitive queue that contains the least/most primitives will be re-allocated). Other arrangements are of course possible, however.

In embodiments of the technology described herein, as discussed above, there are fewer primitive queues than there are regions that the render output is divided into (and for which primitive lists are prepared). This means that, in these embodiments, it may be possible for a primitive that is to be processed fall within a number of regions of the render output that is greater than the supported number of primitive queues, i.e. such that there are not enough primitive queues for (and it is therefore not possible to have a primitive queue allocated to) each of the respective regions that the primitive falls within (at the same time).

In this case, it would be possible to still write the primitive to primitive queues (if desired). For example, the primitive could be written to primitive queues allocated to a subset of regions of the render output that the primitive falls within (with, e.g., the primitive being written directly to primitive lists corresponding to other regions of the render output that the primitive falls within without being written to primitive queues corresponding to those regions).

However, the Applicants have recognised that the extra complexity introduced by handling primitives that cover many regions of the render output in this manner may require extra processing power that could, e.g., outweigh the benefits associated with using the primitive queueing system (as described above). The Applicants have therefore recognised that it could be (and in some embodiments, is) preferable to determine whether or not a primitive to be processed covers a number of regions of render output that is less than or equal to the number of primitive queues that the system has available, before determining to write the primitive to primitive queues.

Thus in an embodiment of the technology described herein, the method further comprises (and the system is correspondingly configured to) before writing a primitive to a primitive list, determining whether the primitive falls within N or fewer regions of the render output, wherein N corresponds to the number of primitive queues that can be allocated to respective regions of the render output at a given time, and when it is determined that the primitive falls within N or fewer regions of the render output, writing the primitive to primitive one or more primitive queues allocated to respective regions of the render output.

Correspondingly, the Applicants have recognised that it may be (and in some embodiments is) preferable to only use the primitive queueing system for primitives that cover (fall within) a number of regions of render output that is less than or equal to the number of primitive queues that the system has available, and to bypass the primitive queueing system altogether for primitives that cover (fall within) a number of regions of the render output that is more than the number of primitive queues that the system has available, i.e. by writing the primitive to primitive lists (for the regions of the render output that the primitive falls within) without first writing the primitive to any of the primitive queues allocated to respective regions of the render output.

Thus, in an embodiment of the technology described herein, the method further comprises (and the system is correspondingly configured to) when it is determined that a primitive covers more than N regions of the render output (wherein N corresponds to the number of primitive queues that can be allocated to respective regions of the render output at a given time), writing the primitive to the primitive lists for the N regions of the render output without writing the primitive to any primitive queues.

Therefore, as will be understood, in these embodiments of the technology described herein, there will exist two (parallel) processes for processing primitives and writing them to primitive lists: a first process (which is used for primitives which cover N or fewer regions of the render output (wherein N corresponds to the number of primitive queues that can be allocated to respective regions of the render output at a given time)), in which primitives are written to one or more primitive queues before being written from the one or more primitive queues to primitive lists; and a second process (which is used for "large" primitives which cover more than N regions of the render output), in which primitives are written to primitive lists without being first written to primitive queues.

In these embodiments, and as will be understood, it may be that a (large) primitive which is being processed and written to primitive lists using the second process covers (falls within) one or more regions of the render output that have one or more primitive queues allocated to them. Those one more primitive queues may contain earlier primitives in the sequence of primitives that have been written to the one or more primitive queues (using the first process).

The Applicants have recognised that, in this case, if the large primitive were to be written to a primitive list corresponding to a region of the render output before the (earlier) primitives written to the queue allocated to that region were written to that primitive list, this could result in the primitives being written to the primitive list "out-of-order" (i.e. such that the order that the primitives would be listed in the primitive list would not match the order in which they were processed, with the later larger primitive appearing before the earlier primitives). The Applicants have recognised that this can be avoided by writing out any primitives in those primitives queues (allocated to regions that the large primitive covers) before writing the large primitive to its primitive lists, when it is determined that the large primitive covers one or more regions of the render output that have one or more primitive queues allocated to them.

Thus in an embodiment of the technology described herein, the method comprises (and the system is correspondingly configured to) before writing a primitive that covers more than N regions of the render output (wherein N corresponds to the number of primitive queues that can be allocated to respective regions of the render output at a given time) to (e.g. any) primitive lists, determining whether not there are any primitive queues allocated to or more regions that the large primitive covers (falls within), and, when it is determined that there are primitive queues allocated to or more regions that the large primitive covers (falls within), writing any primitives in those one or more primitive queues together to the one or more primitive lists corresponding to those one or more regions of the render output, before writing the large primitive to the primitive lists for each of the regions of the render output that the large primitive falls within.

The Applicants have also recognised, when there is a large primitive (that covers more than N regions of the render output) to be processed (using the second process as discussed above), rather than determining whether the large primitive covers (falls within) a region of the render output that has a primitive queue associated with it, it would be possible to simply automatically write out any primitives in primitive queues to primitive lists. This advantageously prevents primitives being written to primitive lists "out-of-order", as discussed above, whilst also avoiding the processing cost associated with checking regions covered by a large primitive against the regions allocated to primitive queues.

Thus in an embodiment of the technology described herein the method comprises (and the system is correspondingly configured to) before writing a primitive that covers more than N regions of the render output (wherein N corresponds to the number of primitive queues that can be allocated to respective regions of the render output at a given time) to primitive lists, writing all primitives in all primitive queues allocated to respective regions of the render output to the primitive lists corresponding to those respective regions of the render output.

The writing of a (large) primitive that that covers more than N regions of the render output to primitive lists corresponding to the regions it covers (falls within) (i.e. the "second process" as discussed above) can be carried out in any suitable and desired manner.

For example, it would be possible to simply directly write the (large) primitive to its primitive lists, by, e.g. directly writing the primitive to each of the primitive lists corresponding to each of the regions that the (large) primitive covers, in turn.

However, the applicants have recognised that, rather than simply directly writing large primitives (that are not processed using the primitive queueing system) to primitive lists, it may be beneficial to "group" together large primitives for the purpose of collectively writing those (large) primitives to primitive lists.

Thus, in embodiments, when it is determined that a primitive is too large (i.e. falls within too many regions of the render output) to be written to primitive queues (i.e. according to the "first process" as discussed above), prior to writing that (large) primitive to a primitive list, it is first determined whether or not that (large) primitive can be "grouped" with one or more previous (large) primitives (i.e. earlier primitives in the sequence of primitives to be processed that also fall within too many regions of the render output to be written to primitive queues), for example (and as will be discussed below) based on what regions of the render output the (large) primitive falls within (compared to the regions the one or more previous (large) primitives fall within).

In these embodiments, when it determined that such a grouping can be made, then the (large) primitive is "grouped" (i.e. added to a group) with the one or more previous (large) primitives. Primitives that have been grouped together in this way are then later written together to primitive lists. In other words, multiple (grouped) primitives are written to a primitive list that corresponds to a region that they cover, in a single primitive list write cycle.

Thus, in these embodiments, rather than writing individual (large) primitives (that fall within too many regions of the render output to be written to the primitive queues according to the "first process" as discussed above) to individual primitive lists in turn, those primitives (in the "second process", as discussed above) can be "grouped" together for the purposes of being written collectively to primitive lists. The Applicants have recognised that this approach is more efficient, since it enables multiple (large) primitives (within the group) to be written to a primitive list in a single primitive list write cycle, and hence can lead to a reduction in the overall number of primitive list write cycles required to write primitives to their primitive lists, compared to conventional systems wherein each primitive is individually written to each required primitive list (in individual primitive list write cycles).

The Applicants have further recognised that this benefit in reducing the overall number of primitive list write cycles required to write the (large) primitives to primitive lists can (and often does) outweigh the processing cost associated with determining whether (large) primitives can be grouped together, thereby leading to an overall reduction in the total processing power and/or number of processing cycles required to store the (large) primitives in their primitive lists.

Thus, in an embodiment of the technology described herein, the method comprises (and the system is correspondingly configured to) before writing the primitive that falls within more than N regions of the render output to a primitive list (wherein N corresponds to the number of primitive queues that can be allocated to respective regions of the render output at a given time), first determining whether the primitive can be grouped with one or more previous primitives that fall within more than N regions of the render output in the sequence of primitives, for the purpose of being written to one or more primitive lists;

when it is determined that the primitive that falls within more than N regions of the render output can be grouped with one or more previous primitives that fall within more than N regions of the render output, grouping the primitive with the one or more previous primitives that fall within more than N regions of the render output; and thereafter:

writing grouped primitives that cover more than N regions of the render output together to one or more primitive lists.

The determination as to whether a primitive can be grouped with one or more previous primitives can be made in any suitable and desired manner, and according to any suitable or desired set of criteria. In an embodiment, it is only possible for it to be determined that the primitive can be grouped with one or more previous primitives when there are one or more such previous primitives available for the primitive to be grouped with, that have also not yet been written to any primitive lists.

In an embodiment, the determination as to whether a primitive can be grouped with one or more previous primitive is made by comparing the primitive with one or more previous primitives, to see if they are sufficiently similar in some way (e.g., and as will be discussed below, in an embodiment based on whether they cover the same or a similar set of regions of the render output). Thus, in embodiments, the method comprises (and correspondingly the system is configured to) determining whether the primitive can be grouped with one or more previous primitives by comparing the primitive to one or more previous primitives As discussed above, the purpose of the grouping of the primitives is to enable multiple primitives to be written to primitive lists (corresponding to regions of the render output that multiple primitives are determined to fall within) together (i.e. within a single primitive list write cycle). The Applicants have recognised that it can therefore be beneficial to specifically choose to only group primitives together that cover the same, or (and as will be discussed further below) similar or overlapping sets of regions of the render output, since this may ensure that (multiple, or a higher proportion of) primitives that are grouped together are to be written to the same one or more primitive lists, and hence can ultimately be written together to those primitive lists.

Thus, in some embodiments, the method comprises (and correspondingly the system is configured to) determining whether a primitive can be grouped with one or more previous primitives based on a set of primitive list regions of the render output covered by (e.g. the bounding box of) the primitive relative to the set of primitive list region(s) of the render output covered by (e.g. the bounding box of) one or more previous primitives.

In some embodiments, it is (only) determined that a primitive can be grouped with one or more previous primitives when the set of regions covered by the primitive exactly matches the set of the regions covered by one of (e.g. and in an embodiment each and every one of) those one or more previous primitives. In these embodiments, if the set of regions covered by the primitive does not exactly match the set of primitives covered by at least one of (e.g. and in an embodiment each and every one of) the one or more previous primitives, then it is determined that the primitive in question cannot be grouped with those previous primitives.

In embodiments, it is determined that the primitive in question cannot be grouped with one or more previous primitives (and, hence, the primitive will not be grouped with one or more previous primitives) when the set of regions covered by the primitive does not (i.e. other than) matches the set of the regions covered by one of (e.g. and in an embodiment each and every one of) those one or more previous primitives.

For example, in one such embodiment, if a primitive has been determined to cover five particular regions of the render output, it is determined that the primitive can only to be grouped with previous one or more primitives if those previous one or more primitives also cover exactly those (same) five regions of the render output. Otherwise, it is determined that the primitive cannot be grouped with those one or more previous primitives.

The Applicants have recognised that only grouping together primitives that are known to cover exactly the same set of regions of the render output can beneficially simplify the grouping process and (as will be discussed further below) reduce the data that is required to be stored and used in order to write primitives from the group to their required primitive lists, as well as simplifying that process of writing primitives to the primitive lists (since all of the primitives in the group will be written to the same set of primitives lists corresponding to the same set of regions, with no deviation in the primitives of the group).

However, as will be understood, having such a stringent requirement (i.e. an exact match of regions covered) between primitives for them to be grouped together in these embodiments may mean that much of the time it will be determined that the primitive in question cannot be grouped with one or previous primitives (since often no such exact match will be present). The Applicants have recognised, therefore, that, in alternative embodiments, it may be beneficial to allow primitives to be grouped together, at least some of which do not cover the exact same set of regions of the render output as one another, but that (as will be discussed further below) cover different sets of regions that are at least sufficiently similar or overlapping to one another. This provides a less stringent requirement for primitives to be grouped together, thereby enabling primitives to be grouped together more often compared to embodiments wherein an exact match of regions covered by primitives is required for a grouping of those primitives to take place, whilst still ensuring that primitives grouped together will cover at least some of the same regions and hence can be written to primitive lists (for the regions they cover in common) together.

Thus, in in an embodiment, the method comprises (and correspondingly the system is configured to) determining that a primitive can (only) be grouped with one or more primitives when the primitive is determined to cover a set of regions that is sufficiently similar to or overlapping with a set of regions covered by one or more previous primitives. In these embodiments, when the set of regions covered by the primitive is not sufficiently (is other than) similar to or overlapping with a set of regions covered by one or more previous primitives, then it is determined that the primitive in question cannot be grouped with those one or more previous primitives.

In an embodiment, it is determined that the primitive in question cannot be grouped with one or more primitives (and, hence, the primitive will not be grouped with one or more previous primitives) when the set of regions covered by the primitive is not (is other than) sufficiently similar to or overlapping with a set of regions covered by one or more previous primitives.

The determination as to whether the set of regions covered by the primitive is sufficiently similar to or overlaps with the set of regions covered by the set of regions covered by (one or more) previous primitives can be carried out in any suitable and desired manner.

For example, in some arrangements it could be the case that it is determined that the primitive can be grouped with one or more previous primitives if at least one region (of the set of regions) covered by the primitive is the same as at least one region (of the set of regions) covered by one or more previous primitives.

In an embodiment, however, wherein the sets of regions covered by respective primitives is determined using the "bounding box" technique (as described above), it is determined that the primitive in question can be grouped with one or more previous primitives when (the set of regions covered by) the bounding box for the primitive is offset from (the set of regions covered by) the bounding box of one or more previous primitives, when the offset is within some particular, in an embodiment selected, in an embodiment predefined, offset threshold.

In other words, in these embodiments, the bounding box for the primitive in question need not (exactly) match the bounding box of one or more previous primitives for it to be determined that the primitive can be grouped with one or more primitives, but (at least some of, and in an embodiment all of) the edges (i.e. the min and max x and y values) of the bounding box of the primitive should be within a certain maximum allowable offset of (i.e. sufficiently close to) the corresponding edges (i.e. the min and max x and y values) of the bounding box of one or more previous primitives.

This maximum offset threshold can be chosen as desired. In an embodiment, wherein the bounding box of primitives is calculated and rounded to the unit of a (square) tile of the render output, the maximum offset threshold is set at a unit of 1 tile length. Thus, in this embodiment, it is determined that a primitive can be grouped with one or more previous primitives if the edges of the bounding box for the primitive are within one tile length (on either side) of the corresponding edges of the bounding box(es) for one or more previous primitives.

For example, in one such embodiment, if a previous primitive was found to have a bounding box having attributes (xmin, ymin, xmax, ymax) of (0, 0, 3, 3), and the present primitive has a bounding box having corresponding attributes of (1, 0, 3, 3), then it would be determined that the present primitive can be grouped with the previous primitive, since the min and max x and y values of the respective bounding boxes are all within the allowed offset threshold (with the xmax, ymin and ymax of the two bounding boxes matching exactly, and the xmin of the present primitive bounding box being 1 unit (i.e. within the threshold allowed offset) away from the xmin of the previous primitive bounding box). However, if the present primitive were instead to have a bounding box with coordinates (2, 0, 3, 3), then it would be determined that the present primitive could not be grouped with the previous primitive, since the xmin value for the bounding box of the present primitive is 2 units (i.e. over the allowed maximum threshold of 1 unit) away from the corresponding xmin value for the bounding box of the previous primitive.

Once it is determined that the (present) primitive can be grouped with one or more previous primitives, the primitive is grouped with those one or more previous primitives. In other words, the primitive is then added to a group with those one or more previous primitives. This can be done in any suitable or desired manner.

In an embodiment, the group of primitives (to which the present primitive is being added) is stored. Thus, after determining that the present primitive can be grouped with one or more previous primitives, the primitive is in an embodiment written to storage alongside those one or more primitives.

The storage (in which the group of primitives is stored) may comprise any suitable and desired storage. The storage may be part of the graphics processing system, or may be separate to the graphics processing system. It may be a dedicated storage for the purpose of storing primitive group data, or it may be part of a storage that is used to store other data in addition to primitive group data. The storage may be any suitable and desired information storage, such as, e.g., a register or registers, a buffer or buffers, a cache or caches, etc.

The group of primitives could be stored in (main) memory whilst the group of primitives is being build up (i.e. whilst primitives are being added to the group of primitives). However, in embodiments, the primitive group data is retained locally to the processing pipeline as pipeline data whilst the group of primitives is being built up. For example, the primitive group data could be stored in one or more registers local to the processing pipeline.

When being added to the group of primitives, the primitive is in an embodiment written to the storage along with any other data relating to the primitive that will later be required to process the primitive or subsequent primitives.

In some embodiments, the primitive is written to storage along with data for the primitive which indicates the set of regions covered by the primitive, that will be later be required (as described below) to write the primitive to the primitive lists corresponding to those regions.

The data that is stored for the primitive to indicate the set of regions covered by the primitive could comprise data indicating (e.g. the full positions of) of each of the regions that it covers (i.e. at least partially falls within).

However, in some embodiments of the technology described herein, when adding the primitive to the group (and writing it to storage), rather than store full "raw" data indicating the set of regions covered by the primitive, more minimal data that indicates the set of regions covered by the primitive is stored. This minimal data is in an embodiment such that it can, when used in conjunction with other data (e.g. data indicating the set of regions covered by the earliest primitive in the group, that is stored when the group is "defined" by that earliest primitive, as discussed further below), indicate the set of set of regions covered by the primitive.

For example, in embodiments (discussed above) wherein a primitive is only grouped with one or more previous primitives when a determined bounding box for the primitive is within an offset threshold from a determined bounding box for a previous (e.g. earliest) primitive, data indicating the offset of the bounding box of the primitive (relative to the bounding box of the previous (e.g. earliest) primitive) is stored (rather than full "raw" data indicating the position of regions covered by the primitive in the render output), since this will be sufficient in order to later write the primitive to primitive lists (when used in conjunction with data indicating the set of regions covered by (the bounding box of) the previous (e.g. earlier) primitive, which, as discussed below, is in an embodiment stored when the group "defined" by that earliest primitive).

In other embodiments (discussed above) wherein a primitive can only be grouped with one or more previous primitives when the primitive covers (i.e. at least partially falls within) a set of regions of render output that exactly matches the set of regions covered by a previous primitive, it is not necessary to store any data indicating the set of regions covered by the specific primitive (since, as will be understood, that set of regions will necessarily be the same as another primitive in the group for the "match" of sets of regions to have occurred, and thus should already be known from (and e.g. stored for the group) e.g., when the group is "defined" by an earlier primitive (as will be discussed further below)).

In embodiments, once the (large) primitive has been added to the group with the one or more previous (large) primitives (and stored (along with any necessary data) alongside those one or more previous (large) primitives), further (subsequent) primitives can be processed.

If the next primitive to be processed is another primitive that covers more than N regions of the render output (i.e. it is a "large" primitive), then that next (large) primitive will in an embodiment also be processed according to the same "second process" as discussed above, and will potentially also be grouped with previous (and further previous) primitives. Thus, once a (large) primitive has been added to the group with the one or more previous primitives, it will in an embodiment then be determined whether a future (subsequent) (large) primitive can be grouped with one or more previous primitives (including the primitive that has just been added to the group), in a corresponding manner to the methods described above. More (subsequent) (large) primitives may be added to the group as they are processed, in this manner, thereby building up the group.

The number of (large) primitives that are grouped together in the manner of the technology described herein may therefore build up over time, as more and more primitives are determined to be able to be added (and subsequently are added) to the group.

When it is determined that a (large) primitive cannot be grouped with any previous (large) primitives (because, e.g., and as discussed above, the set of regions covered by the primitive and/or other feature(s) of the primitive has been determined to not be the same as (or sufficiently similar to) one or more previous primitives) then the (large) primitive is in an embodiment not grouped with one or more previous primitives.

In an embodiment, this triggers the writing of those previous primitives from the group to their respective primitive lists.

Thus, in some embodiments, the method further comprises (and the system is correspondingly configured to) when it is determined that a (large) primitive cannot be grouped with one or more previous primitives, triggering writing one or more previous (large) primitives together to one or more primitive lists, without grouping the (large) primitive with one or more previous primitives.

If the next primitive to be processed (after a (large) primitive has been added to the group of primitives) is a primitive that falls within N or fewer regions of the render output (wherein, as discussed above, N corresponds to the number of primitive queues that can be allocated to respective regions of the render output at a given time) (i.e. is not a "large" primitive) then in an embodiment this primitive is processed using the primitive queueing system (i.e. the "first process", as discussed above), rather than using the primitive grouping system.

As will be understood, it may be that this next primitive being processed falls within regions of the render output that one or more (large) "grouped" primitives (that are in the current group of primitives) also fall within. The Applicants has recognised that, in this case, if this next primitive were to be written a primitive list before one or more (large) grouped primitives were written to that primitive list, this could result in the primitives being written to the primitive lists "out-of-order". The Applicants have recognised that this can be avoided by writing out the (large) grouped primitives in the group of primitives to their primitive lists, before writing the next primitive to any primitive queues (and hence primitive lists).

Thus in an embodiment of the technology described herein, the method comprises (and the system is correspondingly configured to) before writing a subsequent primitive that covers N or fewer regions of the render output to one or more primitive queues (wherein N corresponds to the number of primitive queues that can be allocated to respective regions of the render output at a given time), determining whether the subsequent primitive covers any regions of the render output that are covered by one or more grouped primitives, and when it is determined that the subsequent primitive does cover any regions of the render output that are covered by one or more grouped primitives, writing the grouped primitives together to one or more primitive lists.

The Applicants have also recognised that, when there is a subsequent primitive (that covers N or fewer regions of the render output) to be processed (using the "first process" as discussed above), rather than determining whether the subsequent primitive covers (i.e. falls within) a region of the render output that is also covered by one or more grouped (large) primitives, it would be possible to simply automatically write out any grouped primitives to primitive lists. This advantageously prevents primitives being written to primitive lists "out-of-order", as discussed above, whilst also avoiding the processing cost associated with checking regions covered by a subsequent primitive against the regions covered by grouped primitives.

Thus in an embodiment of the technology described herein, the method comprises (and the system is correspondingly configured to) before writing a subsequent primitive that covers N or fewer regions of the render output to a primitive queue, always writing out any grouped (large) primitives to one or more primitive lists.

Once the grouped (large) primitives have been written to their primitive lists (and thus the group may be considered "empty"), which, as discussed above, could be triggered by a large primitive being determined to not be able to be added to the group, or by a "small" primitive that is to be processed using the primitive queueing system, it is in an embodiment possible for a new group to be started. In an embodiment, the new group of primitives is started by (and "defined" by) the next (large) primitive in the sequence of primitives (e.g. the large primitive that triggered the writing of the grouped primitives to their primitive lists). Further large primitives can then be added to the new group of primitives, such that the new group of primitives builds up over time, e.g. in the manner as described above.

Primitives that have been grouped together (in the manner described above) are written together to one or more primitive lists. This means that, in the process of writing multiple grouped primitives to primitive lists, it should be the case that multiple (i.e. two, and in an embodiment more) of the grouped primitives are written to a primitive list in a single primitive list write cycle.

The writing of primitives grouped primitives together to primitive lists can be carried out in any suitable and desired manner. In an embodiment, it is done by considering each of the regions covered by any of the grouped primitives in turn, and for each of those regions, writing all of the primitives in the group that cover that region together to the primitive list corresponding to that region (in a single primitive list write cycle).

Thus, in embodiments, the step of writing grouped primitives together to one or more primitive lists comprises: for each of the one or more regions covered by the grouped primitives, writing to the primitive list corresponding to that region all of the grouped primitives that cover that region in a single primitive list write cycle.

As will be understood, in order for the grouped primitives to be written to the correct primitive lists, the system will necessarily need to know what regions of the render output are covered by each of the primitives that is being written from the group to the primitive lists (or, correspondingly, which of the grouped primitives fall within each region). In an embodiment, this is determined using data stored indicating the regions that the primitive covers (i.e. at least partially falls within).

For example, in embodiments (discussed above) wherein primitives are only grouped together when they are determined to cover exactly the same set of regions of the render output as one another, the data indicating the set of regions covered by the earliest primitive of the group will sufficiently indicate the set of regions that each of the grouped primitives covers.

In embodiments (discussed above) wherein a primitive is only grouped with one or more previous primitives when a determined bounding box for the primitive is within an offset threshold from a determined bounding box for a previous (e.g. the earliest) primitive in the group, then the set of regions covered by a particular primitive can be determined using the data indicating the offset of the bounding box of the primitive (relative to the bounding box of earliest primitive) along with the data indicating the set of regions covered by the previous (e.g. earliest) primitive of the group.

In embodiments discussed above, the process of grouping (or potentially grouping) primitives together is (only) carried out for primitives that cover more than N regions of the drender output (and that are not processed using the primitive queueing system), such that these "large" grouped primitives can then be written together to primitive lists.

However, the Applicants have recognised that it could be beneficial to use a similar process for grouping (or potentially grouping) primitives together prior to primitives being written to the primitive queues of the technology described herein, such that grouped primitives can then be written together to the primitive queues of the technology described herein. Further, and in contrast to embodiments discussed above, this process need not necessarily be restricted (e.g. to primitives that cover more than N regions of the render output), but rather could be, and in an embodiment is, carried out for any or all of the primitives in the sequence of primitives to be processed.

Thus, in another embodiment of the technology described herein, the method further comprises (and the system is correspondingly configured to) before writing the primitive to one or more primitive queues, first determining whether the primitive can be grouped with one or more previous primitives in the sequence of primitives, for the purpose of being written to one or more primitive queues;

when it is determined that the primitive can be grouped with one or more previous primitives, grouping the primitive with the one or more previous primitives; and thereafter:

writing grouped primitives together to one or more primitive queues.

As will be appreciated by those skilled in the art, these embodiments can, and in an embodiment do, include any one or more or all of the features discussed above (e.g. in relation to the embodiments wherein (large) primitives are grouped together (for the purposes of being collectively written to primitive lists)).

Thus, for example, in embodiments wherein primitives are grouped together for the purposes of being collectively written to primitives queues, the writing of grouped primitives to the primitive queues can be (and in an embodiment is) triggered when it is determined that a primitive cannot be added to the group.

The writing of grouped primitives to primitive queues can be carried out in any suitable or desired manner. In an embodiment multiple grouped primitives are written to multiple primitive queues (allocated to respective regions of the render output that the grouped primitives cover) in a single write cycle. In an embodiment the primitive queues can be allocated or re-allocated to respective regions of the render output as an when is necessary, in the manner as discussed above.

In embodiments wherein primitives are grouped together for the purpose of being collectively written to primitive queues, when grouped primitives that cover (i.e. fall within) more than N regions of the render output (wherein N is the number of primitive queues that can be allocated to respective regions of the render output at a given time) are to be written to primitive queues, this is in an embodiment done by writing the grouped primitives to primitive queues allocated (and/or re-allocated) to respective regions of a subset of the regions of the render output that the grouped primitives cover (i.e. fall within) (e.g. in a first write cycle), with the primitives in at least some of those primitive queues then being written out to their respective primitive lists in order for those primitive queues to then be re-allocated to respective regions of another subset of regions that the grouped primitives so that the grouped primitives can be written to those re-allocated primitive queues (e.g. in a next write cycle), etc and so on, until the grouped primitives have been written to primitive queues corresponding to all of the regions of the render output that those primitives cover.

In the technology described herein, when primitives are written from a primitive queue allocated to a region of the render output to the primitive list corresponding to that region, they are written to the primitive list together, i.e. in a single primitive list write cycle.

As will be understood, this means that the write bandwidth should be, and in an embodiment is, large enough to support the writing of multiple (i.e. two, and in an embodiment more) primitives to a particular primitive list during a single primitive list write cycle. In embodiments, the write bandwidth is large enough to support the writing of a number of primitives to a particular list during a single write cycle equal to the maximum number of primitives that that can be stored in a primitive queue.

Primitives may be written from primitive queues to primitive lists in any suitable and desired manner. In an embodiment, when writing primitives stored in a primitive queue (allocated to a particular region of the render output) to a primitive list (corresponding to a region of the render output), all of the primitives in the primitive queue are written to the primitive list together. In other words, all of the primitives are written from the primitive queue to the primitive list in a single primitive list write cycle.

In embodiments, the writing of primitives from a primitive queue to the corresponding primitive list is triggered when the primitive queue in question needs to be re-allocated to a different region of the render output, and/or when a large primitive (that falls within more regions of the render output than there are primitive queues) is to be written to its required primitive lists (as discussed above).

However, the writing of primitives from primitive queues to primitive lists could also, or instead, be triggered by other means. In an embodiment, the writing of primitives from the primitive queues to the primitive lists is also triggered when there are no more primitives in the sequence of primitives (e.g. "draw call") to be processed (i.e. when there are no more primitives (in the sequence of primitives) to be written to primitive queues).

In embodiments wherein the primitive queues have a maximum allowed size (i.e. a threshold, maximum number of primitives that can be stored in the primitive queue), the writing of primitives from a primitive queue to the corresponding primitive list is in an embodiment (also) triggered once a primitive queue has reached this maximum allowed size (since at this point, there is not any more space to write primitives to the primitive queue).

Thus in an embodiment of the technology described herein, the writing of a primitive from a primitive queue allocated to a region of the render output to the primitive list corresponding to that region of the render output together with any other primitives in the primitive queue is triggered by the number of primitives in the primitive queue allocated to a region of the render output reaching a threshold.

The technology described herein may generally find application in any suitable tile-based rendering graphics processing system.

The technology described herein can be used for all forms of output that a graphics processing pipeline may be used to generate, such as frames for display, render to texture outputs, etc.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured micro-processor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments and embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code configured to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non transitory computer readable medium, for example, diskette, CD ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

FIG. 1 shows schematically a graphics processor 20 that may be operated in accordance with the technology described herein. The graphics processor 20 includes a geometry processor 21, and a renderer 22, both of which can access a memory 23. The memory 23 may be "on chip" with the geometry processor 21 and renderer 22, or may be an external memory that can be accessed by the geometry processor 21 and renderer 22.

Figure 2:
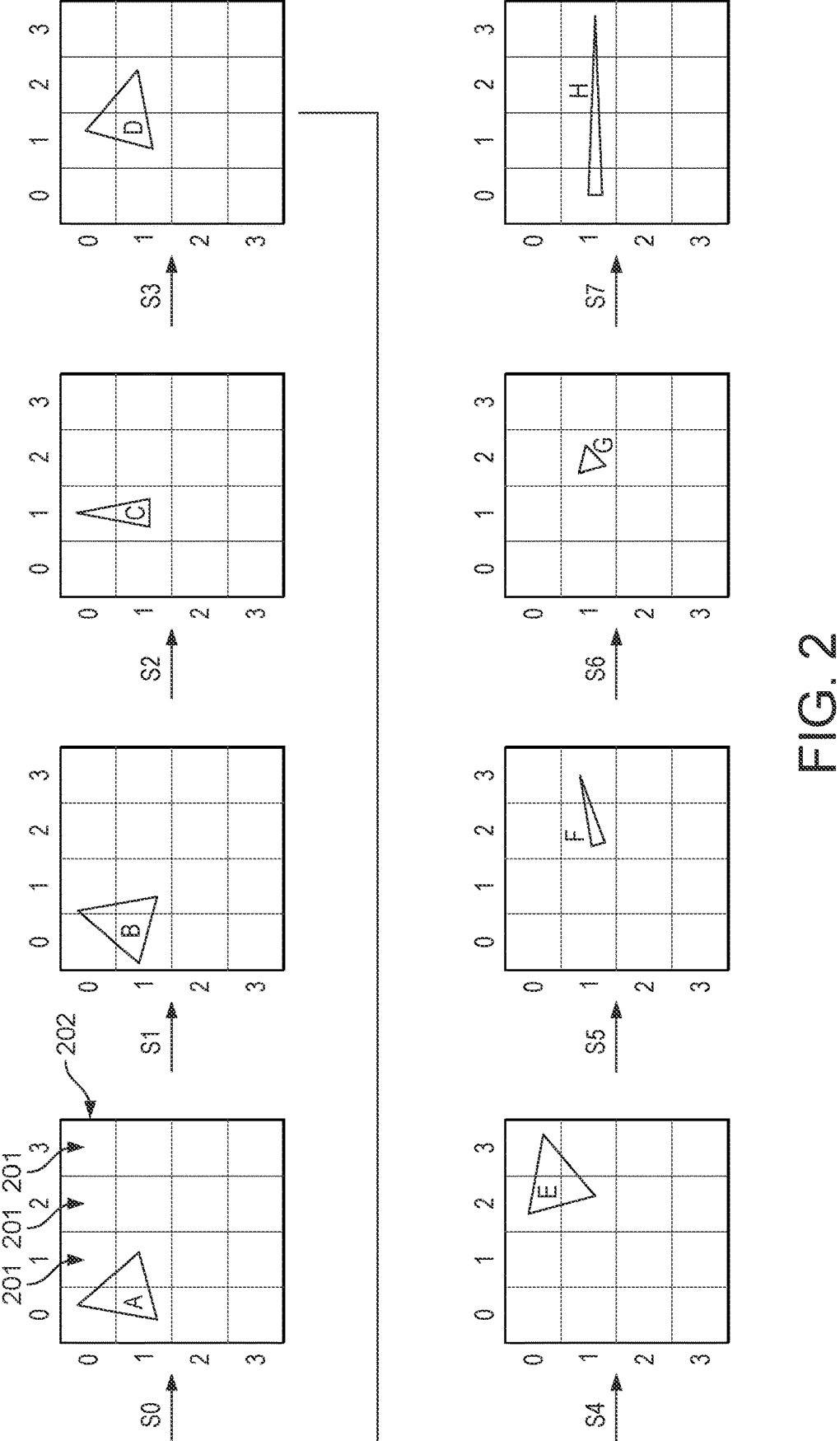
FIG. 2 shows an example sequence of primitives to be processed in an embodiment of the technology described herein.

The memory 23 stores, inter alia, and as shown in FIG. 2, a set of raw geometry data 24 (which is, for example, provided by the graphics processor driver or an API running on a host system (microprocessor) of the graphics processor 20), a set of transformed geometry data 25 (which is the result of various transformation and processing operations carried out on the raw geometry 24), and a set of primitive lists 26.

Each primitive list 26 corresponds to a particular region (in the present embodiment, tile) of the render output being generated, and contains a list of primitives to be rendered for that region (tile).

The transformed geometry data 25 comprises, for example, transformed vertices (vertex data), etc.

The geometry processor 21 comprises, inter alia, a programmable vertex shader 27, a primitive assembly stage 51, and a tiling unit 52 comprising a primitive queueing unit 61 and a primitive list writing circuit 62.

The programmable vertex shader 27 takes as it input the raw geometry data 24 stored in the memory 23, and processes that data to provide transformed geometry data 25 (which it then stores in the memory 23) comprising the geometry data in a form that is ready for two-dimensional ('2D') placement in the frame to be displayed. The programmable vertex shader 27 and the processes it carries out can take any suitable form and be any suitable and desired such processes. The primitive assembly stage 51 takes as its input the transformed and processed vertex data from the programmable vertex shader 27, and assembles geometric primitives using that data.

The tiling unit 52 carries out the tiling, primitive queuing and primitive list writing processes of the technology described herein, in order to prepare the primitive lists which are subsequently used by the renderer 22. To do this, the tiling unit 52 takes as its input the assembled primitives from the primitive assembly stage 51. The tiling unit 52 determines the regions (tiles) of the render output that a primitive (at least partially) falls within (e.g. using a bounding box technique), and the primitive queuing unit 61 determines whether or not the primitive covers a number of regions of the render output that is less than or equal to the number of primitive queues (in the present embodiment, four). When it does, the primitive is written to primitive queues by the primitive queueing unit 61. The primitive list writing circuit 62 writes primitives from the primitive queues to primitive lists 26 which are stored in memory 23.

In the present embodiment, primitive queues are stored in registers local to the processing pipeline. It would of course be possible to instead store the primitive queues in (main) memory.

The primitive queue data stored includes the primitives that are written to the respective primitive queues (in accordance with the technology described herein) along with data indicating the respective regions of the render output to which the respective primitive queues are allocated. In the present embodiment there are four primitive queues (that can be allocated to four respective regions of the render output at a given time).

The processes of writing primitives to primitive queues, including allocating and re-allocating primitive queues to regions of the render output (if necessary), and the writing of primitives from primitive queues, is discussed further below.

The renderer 22 includes a primitive list selection unit 29, a primitive list cache 30, a vertex selection unit 31, a vertex data cache 32, a rasterising unit 33, a rendering unit 34, and tile buffers 35. The render operates on a tile-by-tile basis.

The rasterising unit 33, rendering unit 34, tile buffers 35 operate, in this embodiment, in the same manner as such units normally operate in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to a frame buffer for display.

The primitive list selection unit 29 of the renderer 22 determines which primitive is to be rendered next. It does this by considering the primitive list(s) 26 stored in the memory 23 that apply to the tile being rendered, and selecting from that list(s) the next primitive to be rendered.

The primitive list selection unit 29 can also place one or more primitive lists in the primitive list cache 30.

The primitive list selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

Figure 1B:
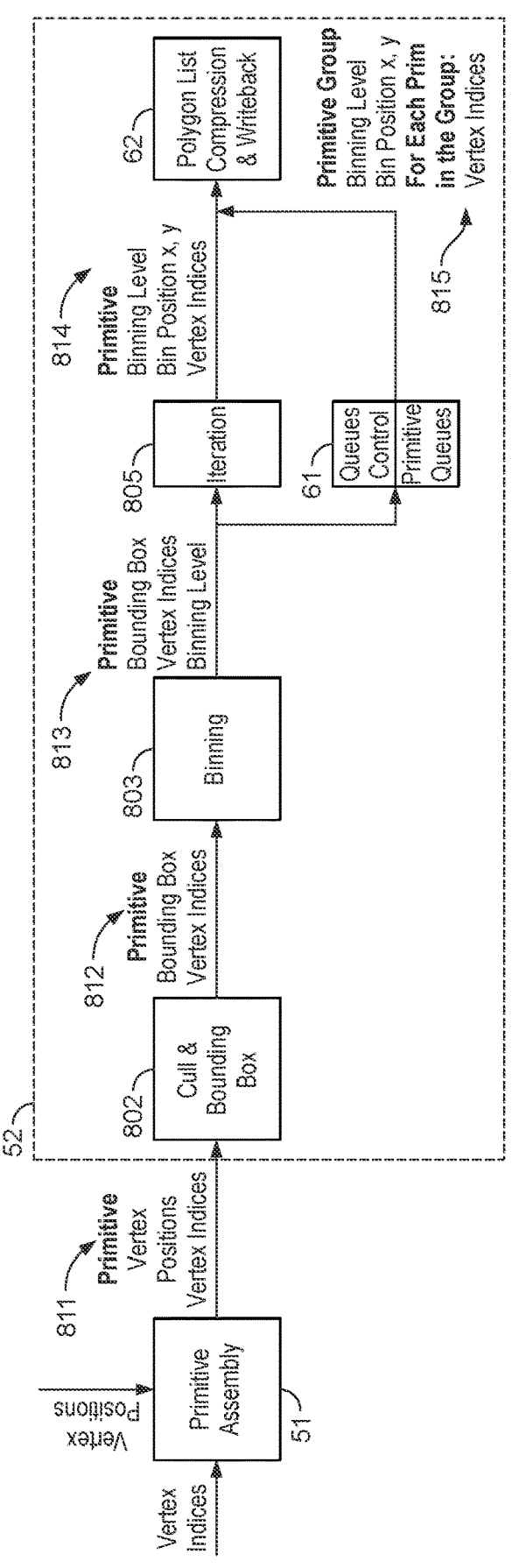
FIG. 1B shows certain parts of the operation of the graphics processing system of FIG. 1A in further detail.

FIG. 1B shows the primitive assembly stage 51 and tiling unit 52 (including the primitive queueing unit 61 and primitive list writing circuit 62) and their operation in further detail.

As discussed above, the primitive assembly stage 51 takes as its input transformed and processed vertex data (from programmable vertex shader 27), assembles geometric primitives using that data, and outputs a sequence of assembled primitives 811 to the tiling stage (tiling unit) 52. The sequence of assembled primitives 811 includes a set of vertex positions and vertex indices for each primitive.

As shown in FIG. 1B, the tiling process first comprises a culling and bounding box generator stage 802, which is then followed by a binning stage 803. This is then followed by either an iteration stage 805 or primitive queueing unit (stage) 61, and primitive list writing circuit (stage) 62.

The culling and bounding box generator 802 generates appropriate bounding boxes for the assembled primitives output by the primitive assembly stage 51, and also operates to identify any primitives that can be culled from further processing on the basis of their potential visibility. (In the present embodiment this visibility culling uses one or more of front/back-face culling, frustum culling, and sample aware culling but other arrangements would, of course, be possible.)

The bounding box generation uses the provided positions for the assembled primitives to generate appropriate bounding boxes for the primitives. In the present embodiment, the bounding boxes are derived at the resolution of (i.e. are rounded to the size of) the regions (e.g. rendering tiles) that the render output is divided into and that the primitive lists are prepared for (but other arrangements would, of course, be possible). The output 812 from the culling and bounding box generation comprises for each primitive a set of vertex indices for the primitive and bounding box data for the primitive.

The binning stage 803 takes the bounding box for a primitive and determines a "binning level" for the primitive, i.e. the level in the hierarchy of sets of regions (for which primitive lists can be prepared) at which the primitive should be written to one or more primitive lists. For example, the primitive could be written to one or more primitive lists corresponding to regions at a lowest (i.e. binning level=0) layer of the hierarchy, wherein the regions correspond to individual tiles of the render output. Alternatively, the primitive could be written to one or more primitive lists corresponding to regions at a higher layer of the hierarchy (e.g. at a binning level=1, wherein each region corresponds to a 2×2 tiles of the render output).

The binning level may be chosen based on any suitable or desired criteria. For example, the binning level may be chosen to achieve a suitable and desired balance between the processing costs associated with writing primitives to and reading primitives from primitive lists (since, and as will be understood, binning a primitive at a higher layer of the hierarchy may the reduce the total number of primitive lists that the primitive will need to be written to, whilst also potentially increasing the number of times that a primitive will need to be read from primitive lists when rendering individual tiles of the render output).

Figure 3:
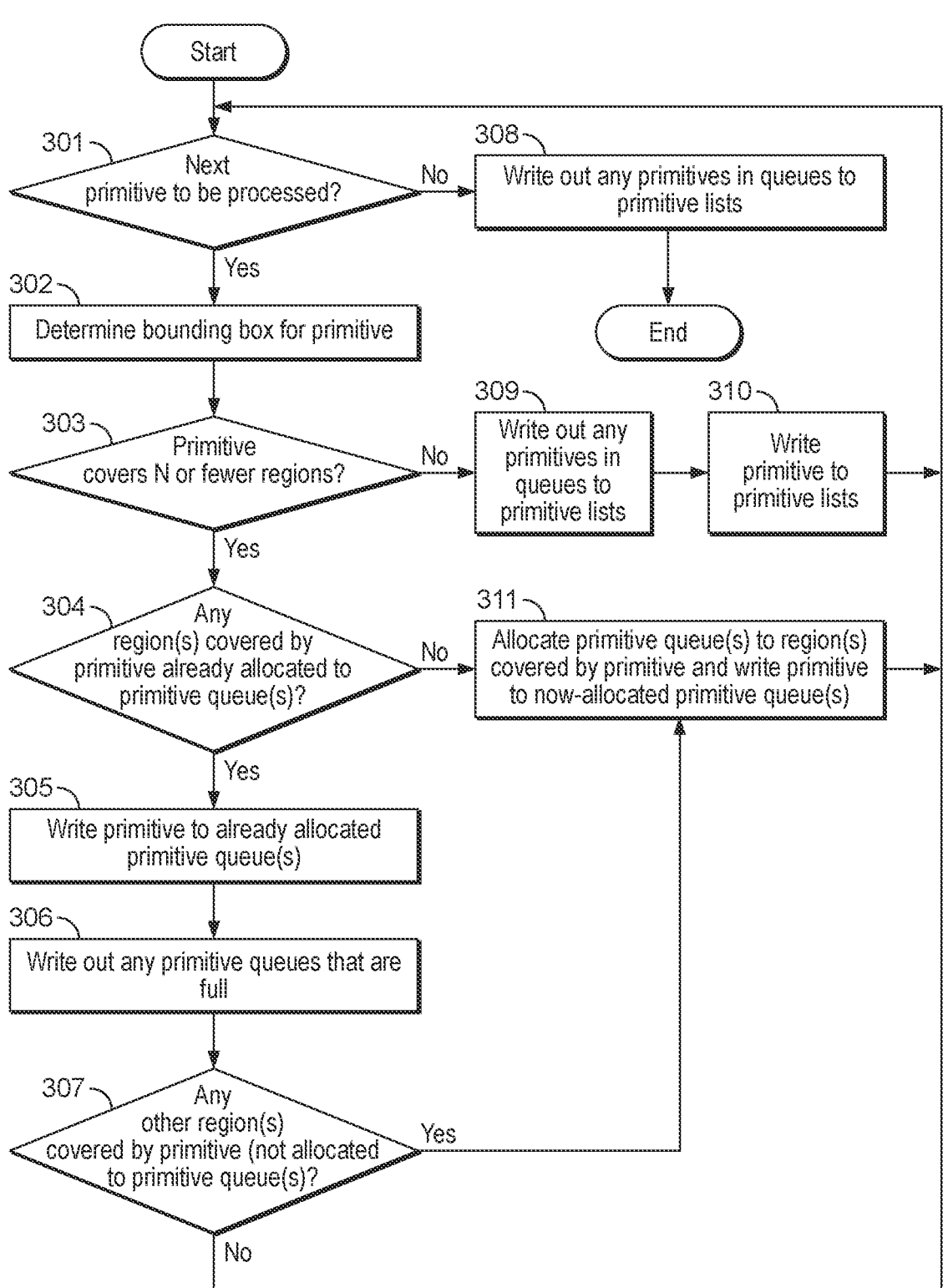
FIG. 3 is a flowchart illustrating a method for writing primitives to primitive queues and writing queued primitives to primitive lists in an embodiment of the technology described herein.

FIGS. 3 and 4 (below) relate to embodiments wherein primitives are added to primitive lists for regions corresponding to individual tiles of the render output (i.e. at a binning level=0).

The binning level and bounding box data for the primitive (output 813 by the binning stage 803) indicates the set of regions that the primitive covers (i.e. at least falls within). Primitives that fall within N or fewer regions of the render output, wherein N is the number of primitive queues (i.e. N=4 in the present embodiment), are sent for queueing by the primitive queueing unit 61, and written to required primitive queues corresponding to respective regions of the render output. Primitive queues build up over time as more primitives are added to them by the primitive queueing unit, until they are "flushed", i.e. it is triggered to write out the primitives stored in the primitive queue together to the primitive to list corresponding to the region of the render output that the primitive queue was allocated to. (The processes of writing primitives to primitive queues and triggering of writing primitives from primitive queues to primitive lists is discussed in further detail below with reference to FIGS. 3 and 4.)

When it is triggered to write out the primitives stored in a primitive queue to a primitive list, the primitive queueing unit 61 outputs 815 the primitives in the queue, including the binning level and data indicating the primitive list (bin) that the primitives should be written to. The primitive lists (bins) are identified by (x, y) positions of the regions (e.g. tiles) to which they correspond. The primitive list writing circuit then writes the primitives into the primitive list 26 in memory 23.

"Large" primitives, i.e. primitives that fall within more than N regions of the render output (wherein N=4 in the present embodiment), are not sent for queuing, and are instead sent to iterator 805. The iterator takes the primitive and outputs 814 the primitive lists (bins) that the primitive list should be written to (identified by their (x, y) positions of the regions (e.g. tiles) to which they correspond). The primitive list writing circuit 62 then writes the primitive into the respective primitive lists 26 in memory 23.

FIG. 2 illustrates a sequence of primitives to be processed. The sequence of primitives (draw call) includes eight primitives A-H that are to be processed one after another.

FIG. 2 shows the position of each primitive within the render output 201, which is divided into tiles 202. Different primitives may fall within (i.e. cover) different tiles 202 of the render output 201, and a single primitive may fall within multiple tiles. For example, primitive A falls within four tiles (i.e. tiles (0,0); (1,0); (0,1) and (1,1)), whereas primitive G only falls within one tile (i.e. tile (2,1)).

In a tile-based graphics processing system, tiles are processed individually in order to generate the render output 202. Therefore primitive A (for example) will have to be processed for each individual tile it falls within, and hence should be written to each of the four separate primitive lists that correspond to each of those four tiles.

FIG. 3 shows a flow chart writing primitives to primitive queues and writing queued primitives to primitive lists according to an embodiment of the technology described herein. The operation of FIG. 3 is carried out by the titling unit 52.

As discussed above, the tiling unit 52 receives as its input a sequence of assembled primitives from primitive assembly stage 51. When there is a (next) primitive in the sequence to be processed (step 301), the tiling unit determines a "bounding box" for the primitive (step 302), in order to determine which regions (in the present embodiment corresponding to render tiles) of the render output the primitive in question (at least partially) falls within.

The primitive queueing unit of the tiling unit then determines whether or not the primitive covers (i.e. at least partially falls within) N or fewer regions, wherein N is the number of primitive queues. In the present embodiment, there are four primitive queues (i.e. N=4).

When it is determined that the primitive being processed covers (at least partially falls within) more than N regions of the render output, the primitive is not sent for queuing. Instead, the primitive list writing unit "flushes" the primitive queues, i.e. writes out any (all) primitives stored in (all) the primitive queues (allocated to respective regions of the render output) together to primitive lists (corresponding to those regions of the render output) (step 309). All of the primitives in a primitive queue are written to the corresponding primitive list in a single primitive list write cycle.

Once all of the primitive queues have been written out in this manner, the primitive being processed (that was determined to cover more than N regions of the render output) is written to its required primitive lists (i.e. the primitive lists corresponding to the regions that the large primitive covers) (step 310). The tiling unit then returns to step 301 (to process a next primitive, if one is available).

However, when it is determined that the primitive being processed covers (i.e. at least partially falls within) N or fewer regions of the render output, this means that the primitive will be processed using the primitive queueing system, and it is determined whether the region(s) covered by the primitive are already allocated to primitive queue(s) (step 304). The primitive queueing unit does this by checking the region(s) covered by the primitive against the data stored for the primitive queues indicating the respective regions of the render output that the primitive queues are allocated to (that is stored in step 311, see below).

When it is determined that there aren't any primitive queues allocated to any of the region(s) of the render output that the primitive covers (falls within), the primitive queueing unit allocates primitive queue(s) to each of the region(s) of the render output that the primitive covers, and then writes the primitive to each of those newly-allocated primitive queues (step 311).

When allocating a primitive queue to a region of the render output that the primitive covers, the primitive queueing unit will preferentially choose to allocate an un-allocated primitive queue (if there is one available). When there are no such un-allocated primitive queues available (i.e. such that all of the primitive queues are already allocated to different regions of the render output), one of the already-allocated primitive queues is chosen to be re-allocated. (In the present embodiment, the primitive queueing unit simply chooses an (already-allocated) primitive queue to re-allocate according to a pre-determined order of hierarchy, although any suitable and desired "replacement algorithm" could be used, as discussed above.)

Before an already-allocated primitive queue is re-allocated, the already-allocated primitive queue is "flushed" by the primitive list writing unit, i.e. all the primitives stored in the already-allocated primitive queue are written together (i.e. in a single primitive list write cycle) to the primitive list for the region to which the primitive queue was (already) allocated.

When allocating a primitive queue to a region of the render output, the primitive queueing unit stores (or updates) data associated with the primitive queue indicating the region of the render output that the primitive queue is now allocated to.

Once the primitive has been written to the newly-allocated primitive queue(s), the tiling unit returns to step 301 (to process another primitive, if one is available).

However, when it is determined that there are primitive queues (already) allocated to (at least one) of the regions covered by the primitive, the primitive is written to the (already allocated) primitive queue(s) (step 305). If this causes a primitive queues to be full (i.e. such that the threshold, or maximum number of primitives that can be stored in the primitive queue at one time is reached), the primitive list writing unit "flushes" the primitive queue i.e. writes out all the primitives stored in the primitive queue together to the primitive list corresponding to the region to which the primitive queue was allocated (step 306).

When there are other region(s) covered by the primitive that were not already allocated to primitive queues (step 307), the primitive queueing unit allocates primitive queue (s) to those region(s) and writes the primitive to those newly-allocated primitive queue(s), including re-allocating and writing out already-allocated primitive queues if necessary (step 311, see above). Once the primitive has been written to the newly-allocated primitive queue(s), the tiling unit returns to step 301 (to process another primitive, if one is available).

When there are not any other region(s) covered by the primitive that were not already allocated to primitive queues (i.e. such that the primitive was written to primitive queue(s) corresponding to all of the regions that it covers in step 305), then the tiling unit returns to step 301 (to process another primitive, if one is available), without e.g. allocating any primitive queues to regions of the render output.

When there are no more primitives to be processed in the sequence of primitives (step 301), the primitive list writing unit writes out any (i.e. all) primitives that are stored in the primitive queues to the primitive lists for the regions that the primitive queues are allocated to (step 308).

FIG. 4 shows a process for writing primitives in the sequence of primitives shown in FIG. 2 to primitive queues, and writing those primitives from the primitive queues.

In this embodiment, for a primitive that is being processed, the set of regions covered by the primitive is determined using a "bounding box" technique (see step 302 in FIG. 3). As described above, this includes drawing a box around the primitive, and determining the set of regions covered by the bounding box. Each bounding box is defined by its attributes (xmin, ymin, xmax, ymax). The bounding box is rounded to the size of the regions (tiles) 202 that the render output 201 is divided into. Thus, for example, the bounding box of primitive A has attributes of (0, 0, 1, 1), whereas the bounding box of primitive G has corresponding attributes of (2, 1, 2, 1).

In this embodiment, there are four primitive queues (Q0, Q1, Q2, Q3) that can be flexibly allocated and re-allocated to four respective different regions (in this embodiment, tiles) of the render output at a given time. At the start of processing of the sequence of primitives (i.e. before any of the primitives in the sequence of primitives have been written to any primitive queues), these primitive queues are all un-allocated (i.e. none of the queues are allocated to specific tiles of the render output).

In S0 (401), primitive A is processed by the tiling unit. The bounding box for the primitive A has attributes (0, 0, 1, 1). At this point the primitive queues are all un-allocated, and so there are no primitive queues allocated to tiles of the render output that primitive A covers. The primitive queueing unit therefore allocates each of the (currently un-allocated) primitive queues to each of the tiles ((0,0), (1,0), (0,1) and (1,1)) that primitive A covers respectively, and writes primitive A to each of those (now-allocated) primitive queues.

In S1 (402), primitive B is processed by the tiling unit. The bounding box for primitive B has attributes (0, 0, 1, 1), and hence covers (i.e. at least partially falls within) the same four tiles as primitive A. Therefore, all of the tiles that primitive B falls within have primitive queues already allocated to them (that were allocated in step 401), and so primitive B is written to each of those primitive queues.

In S2 (403), primitive C is processed by the tiling unit. The bounding box for primitive C has attributes (1, 0, 1, 1), and hence primitive C covers (falls within) tiles (1,0) and (1,1), both of which have primitive queues (Q1 and Q3 respectively) allocated to them. Primitive is therefore written to primitive queues Q1 and Q3.

In S3 (404), primitive D is processed by the tiling unit. The bounding box for primitive D has attributes (1, 0, 2, 1), and primitive D hence covers (falls within) tiles (1,0), (1,1), (2,0) and (2,1). Tiles (1,0) and (1,1) already have primitive queues (Q1 and Q3 respectively) allocated to them, and so primitive D is written to primitive queues Q1 and Q3. However tiles (2,0) and (2,1) do not have primitive queues already allocated to them, and so primitive queues will need to be allocated to tiles (2,0) and (2,1).

This is done by the primitive list writing unit "flushing" (i.e. writing out) already-allocated primitive queues Q0 and Q2 to the primitive lists for the tiles to which they are currently allocated (i.e. tiles (0,0) and (0,1)), and then re-allocating these primitive queues to tiles (2,0) and (2,1) respectively. Thus, the primitive list writing unit writes the primitives stored in Q0, i.e. primitives A and B, together from Q0 to the primitive list corresponding to tile (0,0) in a single primitive list write cycle, and then the primitive queueing unit re-allocates Q0 to tile (2,0) and writes primitive D to Q0. Similarly, the primitive list writing unit writes the primitives stored in Q2, i.e. primitives A and B, together from Q2 to the primitive list corresponding to tile (0,1) in a single primitive list write cycle, and then the primitive queueing unit re-allocates Q2 to tile (2,1) and writes primitive D to Q2.

In S4 (405), primitive E is processed by the tiling unit. The bonding box for primitive E has attributes (2, 0, 3, 1), and hence primitive E covers (falls within) tiles (2,0), (2,1), (3,0) and (3,1). Tiles (2,0) and (2,1) already have primitive queues (Q0 and Q2 respectively) allocated to them, and so primitive E is written to primitive queues Q0 and Q2. However tiles (3,0) and (3,1) do not have primitive queues already allocated to them, and so (similarly to step 404 above) primitive queues will need to be allocated to tiles (3,0) and (3,1).

This is done by the primitive list writing unit "flushing" (i.e. writing out) already-allocated primitive queues Q1 and Q3 to the primitive lists for the tiles to which they are currently allocated (i.e. tiles (1,0) and (1,1), respectively), and then re-allocating these primitive queues to tiles (3,0) and (3,1), respectively. Thus, the primitive list writing unit writes the primitives stored in Q1 (i.e. primitives A, B, C and D) together from Q1 to the primitive list corresponding to tile (1,0) in a single primitive list write cycle, and then the primitive queueing unit re-allocates Q1 to tile (3,0) and writes primitive E to Q1. Similarly, the primitive list writing unit writes the primitives stored in Q3 (i.e. primitives A, B, C and D) together from Q3 to the primitive list corresponding to tile (1,1) in a single primitive list write cycle, and then the primitive queueing unit re-allocates Q3 to tile (3,1) and writes primitive E to Q3.

In S5 (406) primitive F is processed by the tiling unit. The bounding box for primitive F has attributes (2, 1, 3, 1), and hence primitive F covers (falls within) tiles (2,1) and (3,1), both of which have primitive queues (Q2 and Q3 respectively) allocated to them. Primitive is therefore written to Q2 and Q3.

In S6 (407) primitive G is processed by the tiling unit. The bounding box for primitive G has attributes (2, 1, 2, 1) and hence primitive G covers (falls within) tile (2,1) (only), which has queue Q2 allocated to it. Primitive G is therefore written to Q2.

In S7 (408), primitive H is processed by the tiling unit. The bounding box for primitive H has attributes (0, 1, 3, 1), and hence primitive H covers (falls within) tiles (0,1), (1,1), (2,1) and (3,1). Tiles (2,1) and (3,1) already have primitive queues (Q2 and Q3 respectively) allocated to them, and so primitive H is written to primitive queues Q2 and Q3. However tiles (0,1) and (1,1) do not have primitive queues already allocated to them, and so (similarly to steps 404 and 405 above) primitive queues will need to be allocated to tiles (0,1) and (1,1).

This is done by the primitive list writing unit "flushing" (i.e. writing out) already-allocated primitive queues Q0 and Q1 to the primitive lists for the tiles to which they are currently allocated (i.e. tiles (2,0) and (3,0)), and then re-allocating these primitive queues to tiles (0,1) and (1,1) respectively. Thus, the primitive list writing unit writes the primitives stored in Q0 (i.e. primitives D and E) together from Q0 to the primitive list corresponding to tile (2,0) in a single primitive list write cycle, and then the primitive queueing unit re-allocates Q0 to tile (0,1) and writes primitive E to Q0. Similarly, the primitive list writing unit writes primitive D (i.e. the only primitive) stored in Q1 from Q1 to the primitive list corresponding to tile (3,0), and then the primitive queueing unit re-allocates Q1 to tile (1,1) and writes primitive E to Q1.

As there are no more primitives in the sequence of primitives to be processed, the primitive list writing circuit "flushes" (i.e. writes out) all primitive queues Q0, Q1, Q2, and Q3 to the primitive lists to which they are allocated. Thus, the primitive list writing unit writes primitive H (i.e. the only primitive) stored in Q0 to the primitive list corresponding to tile (0,1); then writes primitive H (i.e. the only primitive) stored in Q1 from Q1 to the primitive list corresponding to tile (1,1); then the writes the primitives stored in Q2 (i.e. primitives D, E, F, G and H) together to the primitive list corresponding to tile (2,1) (in a single primitive list write cycle); and finally writes the primitives stored in Q3 (i.e. primitives E, F and H) together to the primitive list corresponding to tile (3,1) (in a single primitive list write cycle).

Figure 5:
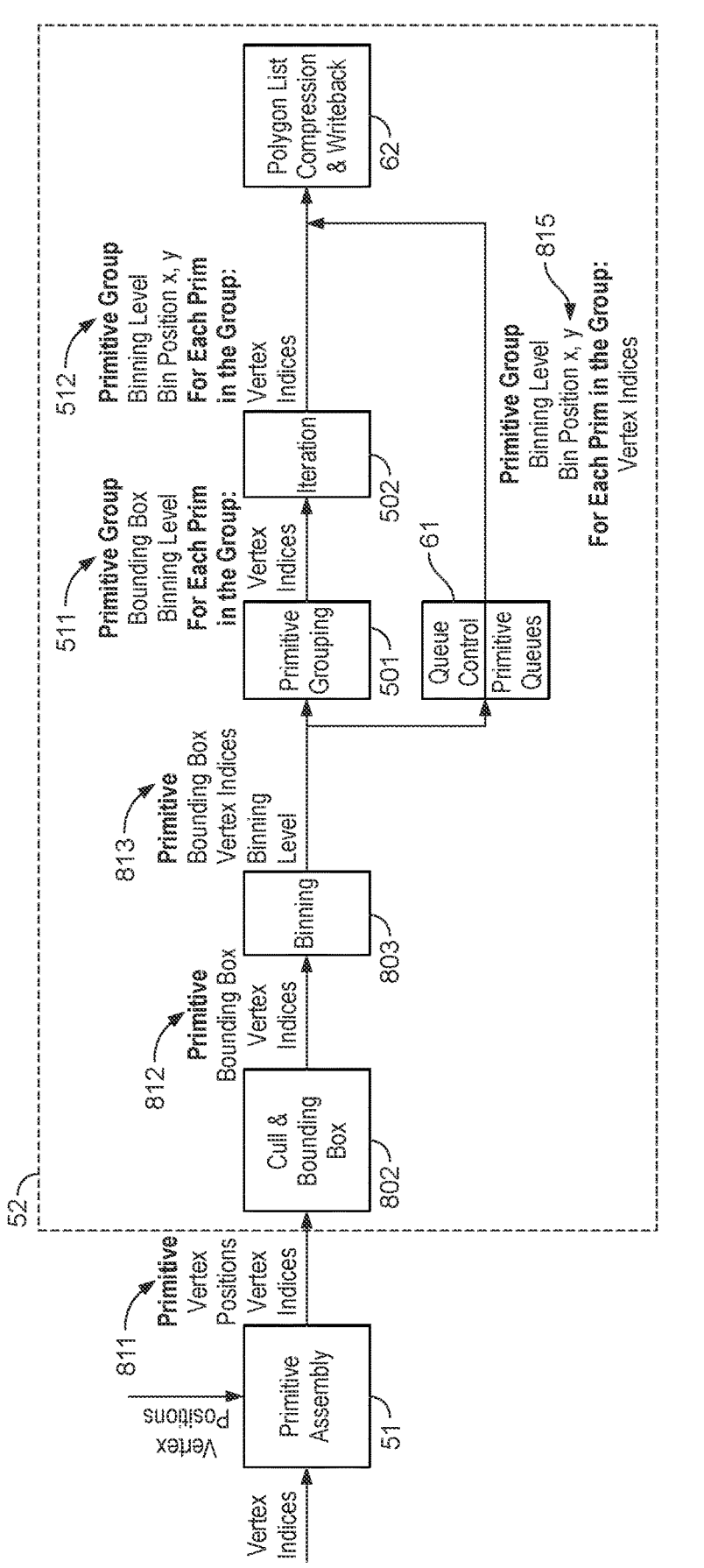
FIG. 5 shows parts of the operation of a graphics processing system in another embodiment of the technology described herein.

FIG. 5 shows the primitive assembly stage 51 and tiling unit 52 and their operation in another embodiment of the technology described herein. In this embodiment, "large" primitives, i.e. primitives that fall within more than N regions of the render output (wherein N corresponds to the number of primitive queues that can be allocated to respective regions of the render output at a given time), rather than being directly sent for iteration and writing to primitive lists, are instead (potentially) grouped together by primitive grouping unit 501, with the grouped primitives then being written together to primitive lists.

The primitive assembly stage 51, culling and bounding box generator stage 802, binning stage 803 and primitive queueing unit 61 operate in the same manner as in the embodiment shown in FIG. 1B (described above).

In this embodiment, "large" primitives that fall within more than N regions of the render output are sent to a primitive grouping unit 501. The binning level and bounding box data for a (large) primitive being processed (output 813 by the binning stage 803) indicates the set of regions that the primitive covers (i.e. at least falls within). When there is no group of primitives available, the primitive grouping unit 501 starts a new group of primitives using the (large) primitive being processed (which "defines" the group going forward). When the (large) primitive starts the new group, the (large) primitive and data indicating the set of regions covered by the (bounding box of) the (large) primitive is stored.

However, when there is already a group of one or more previous (large) primitives available, the primitive grouping unit 501 uses the binning level and bounding box data for the primitive being processed (output 813 by the binning stage 803) to determine whether or not the (large) primitive being processed can be "grouped" (i.e. added to a group) with the one or more previous (large) primitives. When it is determined that the primitive being processed can be grouped (i.e. added to the group with) the one or more previous (large) primitives, the (large) primitive being processed is stored alongside the other (one or more previous) (large) primitives in the group.

The group of (large) primitives builds up over time as the primitive grouping unit 501 adds more (large) primitives that are processed to the group.

When grouped (large) primitives are triggered to be written to their primitive lists, the primitive grouping unit 501 outputs 511 the group of primitives, including bounding box (and binning level) data that identifies the group of primitives. The iterator 502 then takes the group of primitives and outputs 512 the set of primitive lists (bins) that grouped primitives should be written to. The primitive lists (bins) are identified by (x, y) positions of the regions (e.g. tiles) to which they correspond.

The primitive list writing circuit 62 then writes the grouped primitives together into the respective primitive lists 26 in memory 23. In the present embodiment, multiple grouped primitives covering a region (tile) of the render output are written to the primitive list corresponding to that region of the render output in a single primitive list write cycle.

In the present embodiment, grouped primitives are triggered to be written to their primitive lists when it is determined that a (large) primitive covering more than N regions of the render output cannot be grouped (i.e. added to the group) with the previous one or more (large) primitives, and/or when a primitive covering N or fewer regions of the render output is to be processed by the primitive queueing system 61.

Figure 6:
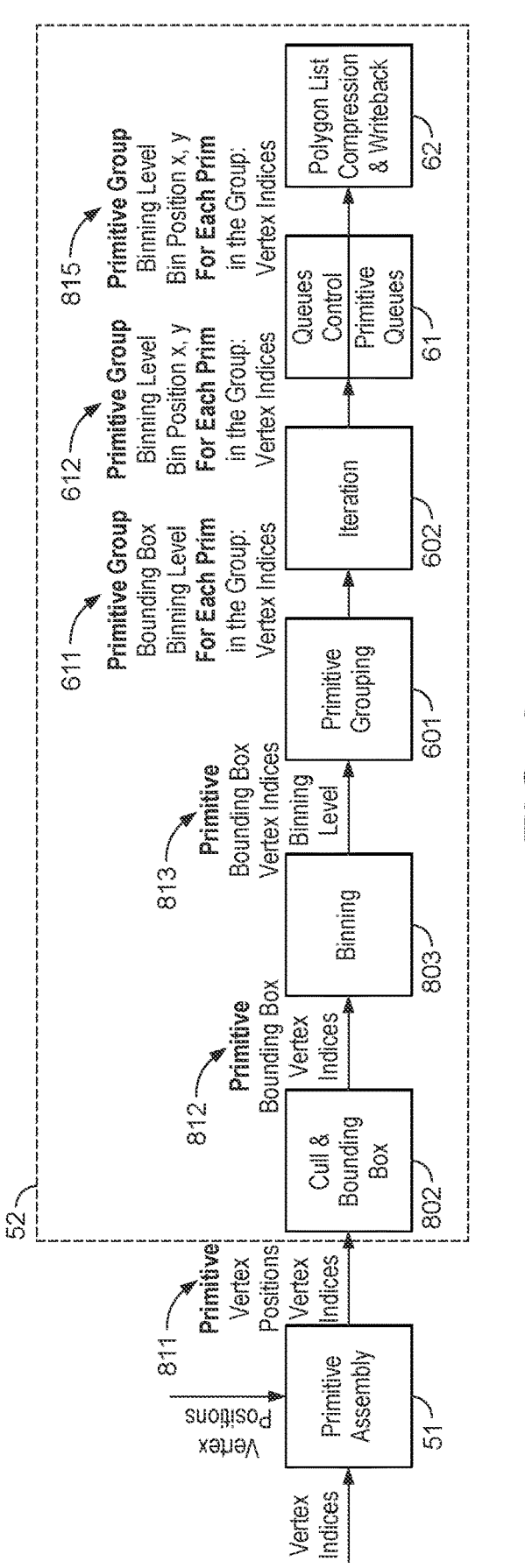
FIG. 6 shows parts of the operation of a graphics processing system in yet another embodiment of the technology described herein.

FIG. 6 shows the primitive assembly stage 51 and tiling unit 52 and their operation in another embodiment of the technology described herein. In this embodiment, primitives are grouped together for the purpose of being collectively written to primitive queues. All primitive in the sequence of primitives being processed are processed by primitive grouping unit 601 before being written to primitive queues.

The primitive assembly stage 51, culling and bounding box generator stage 802 and binning stage 803 operate in the same manner as in the embodiments shown in FIGS. 1B and 5.

In this embodiment, primitives are sent to primitive grouping unit 601. The binning level and bounding box data for a primitive being processed (output 813 by the binning stage 803) indicates the set of regions that the primitive covers (i.e. at least falls within). When there is currently no group of primitives available, the primitive grouping unit 601 starts a new group of primitives using the primitive being processed (which "defines" the group going forward). When the primitive starts the new group, the primitive and data indicating the set of regions covered by the (bounding box of) the primitive is stored.

However, when there is already a group of one or more previous primitives available, the primitive grouping unit 601 uses the binning level and bounding box data for the primitive being processed (output 813 by the binning stage 803) to determine whether or not the primitive being processed can be "grouped" (i.e. added to a group) with the one or more previous primitives. When it is determined that the primitive being processed can be grouped (i.e. added to the group with) the one or more previous (large) primitives, the primitive being processed is stored alongside the other (one or more previous) primitives in the group.

The group of primitives builds up over time as the primitive grouping unit 601 adds more primitives that are processed to the group.

When grouped primitives are triggered to be written to primitive queues, the primitive grouping unit 601 outputs 611 the group of primitives, including bounding box (and binning level) data that identifies the group of primitives. The iterator 602 then takes the group of primitives and outputs 612 the set of primitive lists (bins), and hence corresponding primitive queues, that grouped primitives are to be written to. The primitive lists (bins), and hence primitive queues, are identified by (x, y) positions of the regions (e.g. tiles) to which they correspond. Grouped primitives are then written to primitive queues by the primitive queueing unit 61.

When it is triggered to write out the primitives stored in a primitive queue to a primitive list, the primitive queueing unit 61 output 815 the primitives in the queue, including the binning level and data indicating the primitive list (bin) that the primitives should be written to. The primitive lists (bins) are identified by (x, y) positions of the regions (e.g. tiles) to which they correspond. The primitive list writing circuit then writes the primitives into the primitive list 26 in memory 26

In the present embodiment, primitives are triggered to be written to primitive queues when it is determined that a primitive being processed cannot be grouped (i.e. added to the group) with the one or more previous primitives.

In the embodiments shown in FIGS. 5 and 6, it is determined that a primitive being processed cannot be grouped (i.e. added to the group) with one or more previous primitives when the (bounding box of the) primitive covers a set of regions that does not exactly match the set of regions covered by (bounding boxes of the) one or more previous primitives. However, this need not necessarily be the case, and it would be possible, for example, for the system to determine to group a primitive with one or more previous primitives when the bounding box for the primitive is offset from the bounding box of a previous primitive, within an offset threshold.

In the embodiments shown in FIGS. 5 and 6, the group of primitives is stored locally to the processing pipeline (in one or more registers) as they are being built up (i.e. whilst primitives are being added to the group of primitives). However, it would of course be possible to instead store the group of primitives in (main) memory.

It can be seen from the above that the technology described herein, in its embodiments at least, can be used to reduce the overall number of primitive list write cycles (and hence overall processing power) required to write primitives to primitive lists.

This is achieved, in the embodiments at least, by writing primitives allocated to respective regions of the render output before writing them to their required primitive lists, and writing primitives stored in a primitive queue together to the corresponding primitive list (i.e. such that multiple primitives are written together to the primitive list in a single primitive list write cycle).

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a tile-based graphics processing system in which a render output is sub-divided into a plurality of tiles for rendering, and in which primitives in a sequence of primitives to be processed are written to primitive lists corresponding to respective regions of the render output, the method comprising:

before writing a primitive to a primitive list, writing the primitive to one or more primitive queues, allocated to respective regions of the render output, of N primitive queues that can be allocated to respective regions of the regions render output at a given time, wherein N is less than the number of regions of the render output for which primitive lists are prepared; and thereafter:

writing the primitive from a primitive queue allocated to a region of the render output to a primitive list corresponding to that region of the render output, together with any other primitives in the primitive queue.

2. The method of claim 1, further comprising writing the primitive to primitive queues allocated to each of the regions that the primitive falls within.

3. The method of claim 1, further comprising determining whether there is already a primitive queue allocated to a region of the render output that the primitive covers; and when it is determined that there is already a primitive queue allocated to the region of the render output that the primitive covers, writing the primitive to that already-allocated primitive queue.

4. The method of claim 3, further comprising:

when it is determined that that there is not already a primitive queue allocated to the region of the render output that the primitive covers, allocating a primitive queue to the region of the render output that the primitive covers; and writing the primitive to that now-allocated primitive queue.

5. The method of claim 4, further comprising:

writing any primitives in a primitive queue allocated to a different region of the render output together to a primitive list corresponding to that different region of the render output; and re-allocating that primitive queue that was allocated to a different region of the render output to the region of the render output that the primitive falls within.

6. The method of claim 1, further comprising:

before writing a primitive to a primitive list, determining whether the primitive falls within N or less regions of the render output; and when it is determined that the primitive falls within N or less regions of the render output, writing the primitive to one or more primitive queues allocated to respective regions of the render output.

7. The method of claim 6, further comprising:

when it is determined that the primitive falls within more than N regions of the render output, writing the primitive that falls within more than N regions of the render output to primitive lists without writing the primitive that falls within more than N regions of the render output to any primitive queues.

8. The method of claim 7, further comprising:

before writing the primitive that falls within more than N regions of the render output to primitive lists, determining whether not there are any primitive queues allocated to one or more regions that the primitive that falls within more than N regions of the render output falls within; and when it is determined that there are primitive queues allocated to or more regions that the primitive that falls within more than N regions of the render output falls within, writing any primitives in those one or more primitive queues together to the one or more primitive lists corresponding to those one or more regions of the render output, before writing the primitive that falls within more than N regions of the render output to primitive lists.

9. The method of claim 7, further comprising:

before writing the primitive that falls within more than N regions of the render output to primitive lists, writing any primitives in all primitive queues allocated to respective regions of the render output to the primitive lists corresponding to those respective regions of the render output.

10. The method of claim 7, further comprising:

before writing the primitive that falls within more than N regions of the render output to a primitive list, first determining whether the primitive that falls within more than N regions of the render output can be grouped with one or more previous primitives that fall within more than N regions of the render output in the sequence of primitives, for the purpose of being written to one or more primitive lists;

when it is determined that the primitive that falls within more than N regions of the render output can be grouped with one or more previous primitives that fall within more than N regions of the render output, grouping the primitive that falls within more than N regions of the render output with the one or more previous primitives that fall within more than N regions of the render output; and thereafter:

writing grouped primitives that cover more than N regions of the render output together to one or more primitive lists.

11. The method of claim 1, further comprising:

before writing the primitive to one or more primitive queues, first determining whether the primitive can be grouped with one or more previous primitives in the sequence of primitives, for the purpose of being written to one or more primitive queues;

when it is determined that the primitive can be grouped with one or more previous primitives, grouping the primitive with the one or more previous primitives; and thereafter:

writing grouped primitives together to one or more primitive queues.

12. A tile-based graphics processing system in which a render output is sub-divided into a plurality of tiles for rendering, and comprising a tiling circuit configured to write primitives in a sequence of primitives to be processed to primitive lists corresponding to respective regions of the render output, wherein the tiling circuit comprises:

a primitive queueing circuit configured to:

before a primitive is written to a primitive list, write the primitive to one or more primitive queues, allocated to respective regions of the render output, of N primitive queues that can be allocated to respective regions of the regions render output at a given time, wherein N is less than the number of regions of the render output for which primitive lists are prepared; and a primitive list writing circuit configured to:

write a primitive from a primitive queue allocated to a region of the render output to a primitive list corresponding to that region of the render output, together with any other primitives in the primitive queue.

13. The tile-based graphics processing system of claim 12, wherein the primitive list writing circuit is configured to write a primitive to primitive queues allocated to each of the regions that the primitive falls within.

14. The tile-based graphics processing system of claim 12, wherein the primitive queueing circuit is configured to:

determine whether there is already a primitive queue allocated to a region of the render output that a primitive covers; and when it is determined that there is already a primitive queue allocated to the region of the render output that a primitive covers, write the primitive to that already-allocated primitive queue.

15. The tile-based graphics processing system of claim 14, wherein the primitive queueing circuit is configured to:

when it is determined that there is not already a primitive queue allocated to a region of the render output that the primitive covers, allocate a primitive queue to the region of the render output that the primitive covers; and write the primitive to that now-allocated primitive queue.

16. The tile-based graphics processing system of any claim 15, wherein the primitive list writing circuit is configured to, when it is determined that there is not already a primitive queue allocated to a region of the render output that the primitive covers, write any primitives in a primitive queue allocated to a different region of the render output together to a primitive list corresponding to that different region of the render output;

and the primitive queuing unit is configured to re-allocate that primitive queue that was allocated to a different region of the render output to the region of the render output that the primitive falls within.

17. The tile-based graphics processing system of claim 12, wherein the primitive queueing circuit is configured to:

before a primitive is written to a primitive list, determine whether the primitive falls within N or less regions of the render output; and when it is determined that a primitive falls within N or less regions of the render output, write the primitive to one or more primitive queues allocated to respective regions of the render output.

18. The tile-based graphics processing system of claim 17, wherein the primitive list writing configured to:

when it is determined that a primitive falls within more than N regions of the render output, writing the primitive that falls within more than N regions of the render output to one or primitive lists, without the primitive being written to any primitive queues.

19. The tile-based graphics processing system of claim 18, wherein the primitive queueing circuit is configured to:

before a primitive that falls within more than N regions of the render output is written to one or more primitive lists, determine whether not there are any primitive queues allocated to or more regions that the primitive that falls within more than N regions of the render output falls within; and the primitive list writing circuit is configured to:

when it is determined that there are primitive queues allocated to or more regions that the primitive that falls within more than N regions of the render output falls within, write any primitives in those one or more primitive queues together to the one or more primitive lists corresponding to those one or more regions of the render output, before the primitive that falls within more than N regions of the render output is written to primitive lists.

20. A non-transitory computer readable storage medium storing instructions which, when the instructions are executed by a processor, cause the processor to carry out a method of operating a tile-based graphics processing system in which a render output is sub-divided into a plurality of tiles for rendering, and in which primitives in a sequence of primitives to be processed are written to primitive lists corresponding to respective regions of the render output, the method comprising:

before writing a primitive to a primitive list, writing the primitive to one or more primitive queues, allocated to respective regions of the render output, of N primitive queues that can be allocated to respective regions of the regions render output at a given time, wherein N is less than the number of regions of the render output for which primitive lists are prepared; and thereafter:

writing the primitive from a primitive queue allocated to a region of the render output to a primitive list corresponding to that region of the render output, together with any other primitives in the primitive queue.

\* \* \* \* \*